(12) United States Patent
Onizawa et al.

(10) Patent No.: US 7,577,485 B2
(45) Date of Patent: Aug. 18, 2009

(54) AUTOMOBILE MANUFACTURING LINE INPUT ORDER PLANNING APPARATUS

(75) Inventors: Hitoshi Onizawa, Hitachi (JP); Masanori Sato, Hitachi (JP); Kei Nakamura, Tokyo (JP); Atsumi Ichikawa, Saitama (JP); Hiroshi Soejima, Atsugi (JP); Shinichi Sakagami, Kitakyusyu (JP); Yutaka Sanada, Yokohama (JP)

(73) Assignees: Hitachi, Ltd., Tokyo (JP); Nissan Motor Co., Ltd., Yokohama-shi (JP); Hitachi Engineering Co., Ltd., Hitachi-shi (JP)

( * ) Notice: Subject to any disclaimer, the term of this patent is extended or adjusted under 35 U.S.C. 154(b) by 290 days.

(21) Appl. No.: 10/507,520

(22) PCT Filed: Feb. 27, 2003

(86) PCT No.: PCT/JP03/02195

§ 371 (c)(1), (2), (4) Date: Apr. 6, 2005

(87) PCT Pub. No.: WO03/079124

PCT Pub. Date: Sep. 25, 2003

(65) Prior Publication Data

US 2005/0182505 A1 Aug. 18, 2005

(30) Foreign Application Priority Data

Mar. 15, 2002 (JP) .............................. 2002-071985

(51) Int. Cl.
*G06F 19/00* (2006.01)
(52) U.S. Cl. .................. 700/100; 700/97; 700/103; 700/106; 700/216; 700/223

(58) Field of Classification Search ................... 700/97, 700/99–104, 106, 107, 213, 214, 216, 223; 706/13, 15

See application file for complete search history.

(56) References Cited

U.S. PATENT DOCUMENTS 5,177,688 A * 1/1993 Rentschler et al. .......... 700/101

(Continued)

FOREIGN PATENT DOCUMENTS

DE 199 02 056 C1 10/2000

(Continued)

OTHER PUBLICATIONS

English translation of IPER for PCT/JP03/02195.

(Continued)

*Primary Examiner*—Sean P Shechtman
(74) *Attorney, Agent, or Firm*—Crowell & Moring LLP

(57) ABSTRACT

The invention is intended to provide a building sequence planning system for an automobile production line, which can prepare an efficient building sequence. The system comprises an input unit (1) for inputting information of vehicles to be manufactured, a processing unit (3) for deciding an optimum building sequence based on the vehicle information inputted through the input unit (1), and an output unit (5) for externally outputting a building sequence schedule decided by the processing unit (3). The processing unit (3) prepares a vehicle building sequence, determines a degree of dissatisfaction of the prepared building sequence, as a penalty value, in accordance with restriction conditions which are inputted through the input unit (1) and are imposed when building the vehicles into work, and decides a building sequence with a minimum penalty by preparing a plurality of building sequences and determining the penalty value for each building sequence with respect to the restriction conditions.

3 Claims, 28 Drawing Sheets

U.S. PATENT DOCUMENTS 6,233,493 B1 * 5/2001 Cherneff et al. ................ 700/95
6,546,302 B1 * 4/2003 Bergeon ..................... 700/101

FOREIGN PATENT DOCUMENTS

| | | | |
|---|---|---|---|
| DE | 19902056 | * | 10/2000 |
| EP | 0 468 728 A2 | | 1/1992 |
| JP | 6-348715 | * | 12/1994 |
| JP | 7-60619 | * | 3/1995 |
| JP | 8-174388 | | 7/1996 |
| JP | 8-255197 | | 10/1996 |
| JP | 9-282375 | | 10/1997 |

OTHER PUBLICATIONS

European Search Report dated Feb. 3, 2006 (Three (3) pages).

* cited by examiner

FIG.6A

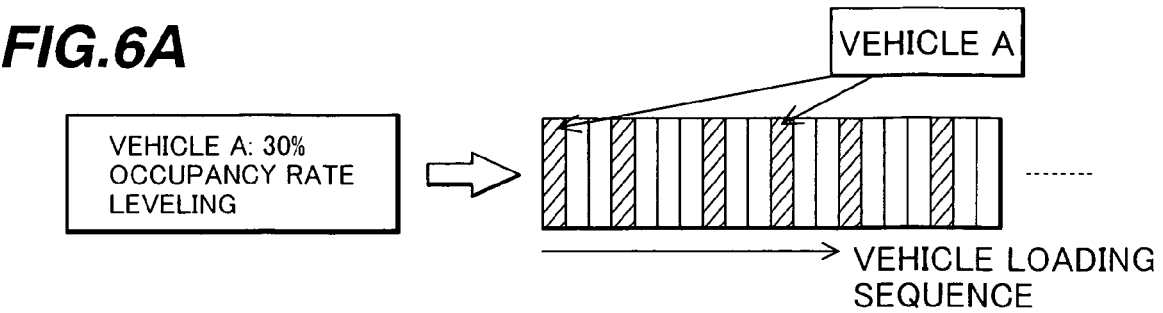

VEHICLE A: 30% OCCUPANCY RATE LEVELING

→ VEHICLE LOADING SEQUENCE

FIG.6B

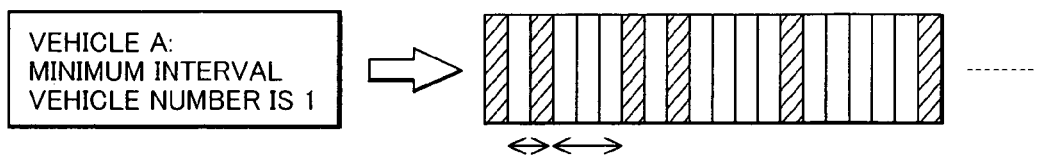

VEHICLE A: MINIMUM INTERVAL VEHICLE NUMBER IS 1

FIG.6C

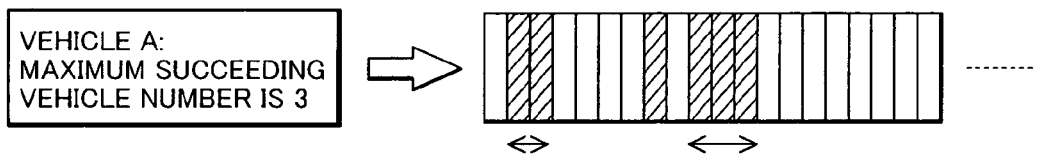

VEHICLE A: MAXIMUM SUCCEEDING VEHICLE NUMBER IS 3

FIG.6D

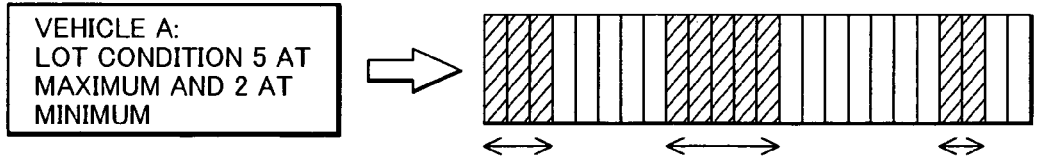

VEHICLE A: LOT CONDITION 5 AT MAXIMUM AND 2 AT MINIMUM

FIG.6E

NUMBER OF OFFLINE VEHICLES: 30
ASSIGNMENT RANGE DESIGNATION: 0% TO 50% (THIS EMBODIMENT INSTRUCTS ASSIGNMENT WITHIN FRONT HALF OF 100% ENTIRETY)

ASSIGNMENT RANGE OF VEHICLES A (ASSIGNMENT IN RANGE OF FIRST TO 15TH VEHICLE)

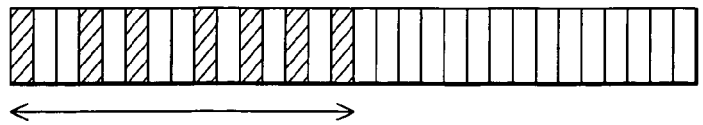

FIG.11A

ARRAY SEQUENCE 1

| S |    |
|---|----|
| M |    |
| M | WD |
| S |    |
| M |    |
| S | WD |
| M |    |
| M |    |
| M |    | ← RANDOM NUMBER 2
| M |    |
| M | WD | ← RANDOM NUMBER 1
| M |    |
| M | WD |
| S |    |
| S | WD |
| M |    |
| M |    |
| M |    |
| M | WD |
| M |    |

FIG.11B

ARRAY SEQUENCE 2

| S |    |
|---|----|
| M |    |
| M | WD |
| S |    |
| M |    |
| S | WD |
| M |    |
| M |    |
| M | WD |
| M |    |
| M |    |
| M | WD |
| S |    |
| S | WD |
| M |    |
| M |    |
| M |    |
| M | WD |
| M |    |

EXCHANGE

FIG.12

|   |          | WEIGHT | MINIMUM INTERVAL | MAXIMUM SUCCEEDING VEHICLES | AVERAGE INTERVAL |
|---|----------|--------|------------------|-----------------------------|------------------|
| S | SEDAN    | -5     | 1                |                             | 3                |
| WD| 4WD      | -5     | 2                |                             | 2.3              |
| M | MINI-VAN | -5     |                  | 3                           | 0.2              |

FIG.13

| ARRAY SEQUENCE 1 | | ARRAY SEQUENCE | OCCUPANCY RATE | | | RESTRICTION CONDITION | | |
|---|---|---|---|---|---|---|---|---|
| | | | SEDAN | 4WD | MINI-VAN | SEDAN Min | 4WD Min | MINI-VAN Max |
| S | | SEDAN | 0 | | | | | |
| M | | MINI-VAN | | | 0 | | | |
| M | WD | MINI-VAN+4WD | | 0 | −0.2 | | 0 | 0 |
| S | | SEDAN | −5 | | | 0 | | |
| M | | MINI-VAN | | | −3.2 | | | 0 |
| S | WD | SEDAN+4WD | −20 | −0.45 | | 0 | 0 | |
| M | | MINI-VAN | | | −3.2 | | | |
| M | | MINI-VAN | | | −0.2 | | | |
| M | | MINI-VAN | | | −0.2 | | | |
| M | | MINI-VAN | | | −0.2 | | | |
| M | WD | MINI-VAN+4WD | | −14.45 | −0.2 | | 0 | |
| M | | MINI-VAN | | | −0.2 | | | |
| M | WD | MINI-VAN+4WD | | −8.45 | −0.2 | | −5 | −80 |
| S | | SEDAN | −80 | | | 0 | | |
| S | WD | SEDAN+4WD | −45 | −8.45 | | −5 | −5 | |
| M | | MINI-VAN | | | −9 | | | |
| M | | MINI-VAN | | | −0.2 | | | |
| M | | MINI-VAN | | | −0.2 | | | |
| M | WD | MINI-VAN+4WD | | −2.45 | −0.2 | | 0 | |
| M | | MINI-VAN | | | −0.2 | | | −20 |
| | | COLUMN TOTAL | −150 | −34.25 | −17.6 | −5 | −10 | −100 |
| | | TOTAL | | | | | | −316.85 |

FIG.14

| | ARRAY SEQUENCE | OCCUPANCY RATE ||| RESTRICTION CONDITION |||
|---|---|---|---|---|---|---|---|
| | | SEDAN | 4WD | MINI-VAN | SEDAN Min | 4WD Min | MINI-VAN Max |
| S | SEDAN | 0 | | | | | |
| M | MINI-VAN | | | 0 | | | |
| M  WD | MINI-VAN+4WD | | 0 | -0.2 | | 0 | 0 |
| S | SEDAN | -5 | | | 0 | | |
| M | MINI-VAN | | | -3.2 | | | 0 |
| S  WD | SEDAN+4WD | -20 | -0.45 | | 0 | 0 | |
| M | MINI-VAN | | | -3.2 | | | |
| M | MINI-VAN | | | -0.2 | | | |
| M  WD | MINI-VAN+4WD | | -0.45 | -0.2 | | 0 | |
| M | MINI-VAN | | | -0.2 | | | |
| M | MINI-VAN | | | -0.2 | | | |
| M | MINI-VAN | | | -0.2 | | | |
| M  WD | MINI-VAN+4WD | | -2.45 | -0.2 | | 0 | -80 |
| S | SEDAN | -80 | | | 0 | | |
| S  WD | SEDAN+4WD | -45 | -8.45 | | -5 | -5 | |
| M | MINI-VAN | | | -9 | | | |
| M | MINI-VAN | | | -0.2 | | | |
| M | MINI-VAN | | | -0.2 | | | |
| M  WD | MINI-VAN+4WD | | -2.45 | -0.2 | | 0 | |
| M | MINI-VAN | | | -0.2 | | | -20 |
| | COLUMN TOTAL | -150 | -14.25 | -17.6 | -5 | -5 | -100 |
| | TOTAL | | | | | | -291.85 |

FIG.15

| | ARRAY SEQUENCE | OCCUPANCY RATE | | | RESTRICTION CONDITION | | |
|---|---|---|---|---|---|---|---|
| | | SEDAN | 4WD | MINI-VAN | SEDAN Min | 4WD Min | MINI-VAN Max |
| S WD | SEDAN+4WD | 0 | | | 0 | 0 | |
| M | MINI-VAN | | | 0 | | | |
| M | MINI-VAN | | | −0.2 | | | 0 |
| S WD | SEDAN+4WD | −5 | 0 | | 0 | 0 | |
| M | MINI-VAN | | | −3.2 | | | |
| M | MINI-VAN | | | −0.2 | | | 0 |
| S WD | SEDAN+4WD | −5 | −0.45 | | 0 | 0 | |
| M | MINI-VAN | | | −3.2 | | | |
| M | MINI-VAN | | | −0.2 | | | 0 |
| S | SEDAN | −5 | | | 0 | | |
| M WD | MINI-VAN+4WD | | −2.45 | −3.2 | | 0 | |
| M | MINI-VAN | | | −0.2 | | | |
| M | MINI-VAN | | | −0.2 | | | 0 |
| S | SEDAN | 0 | | | 0 | | |
| M WD | MINI-VAN+4WD | | −2.45 | −3.2 | | 0 | |
| M | MINI-VAN | | | −0.2 | | | |
| M | MINI-VAN | | | −0.2 | | | 0 |
| S | SEDAN | 0 | | | 0 | | |
| M WD | MINI-VAN+4WD | | −2.45 | −3.2 | | 0 | |
| M | MINI-VAN | | | −0.2 | | | 0 |
| | COLUMN TOTAL | −15 | −7.8 | −17.6 | 0 | 0 | 0 |
| | TOTAL | | | | | | −40.4 |

ASSEMBLY ENTRY    OFFLINE

NUMBER OF RESIDING VEHICLES = 8
LINE SPEED = 1 VEHICLE/Hr

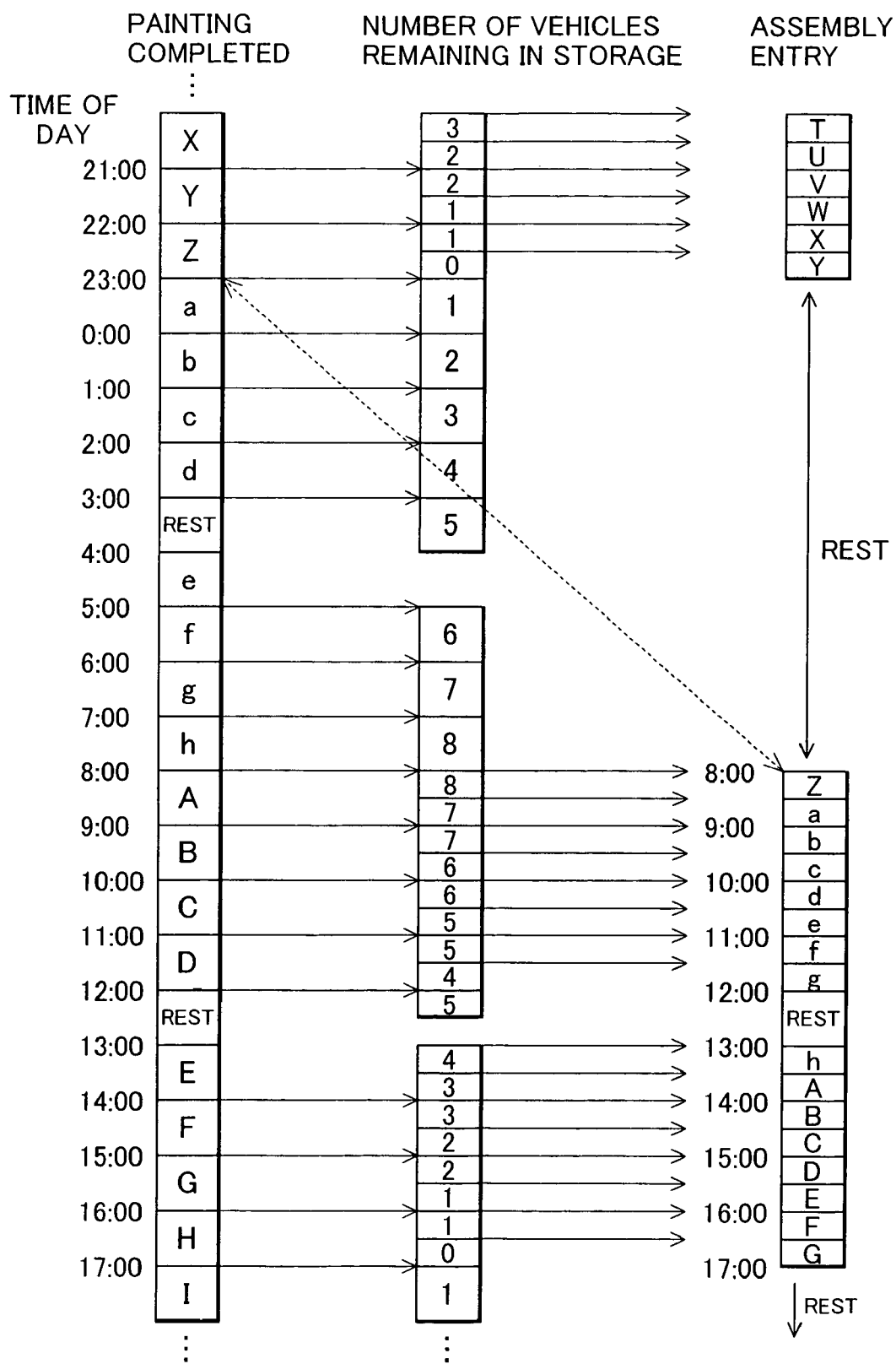

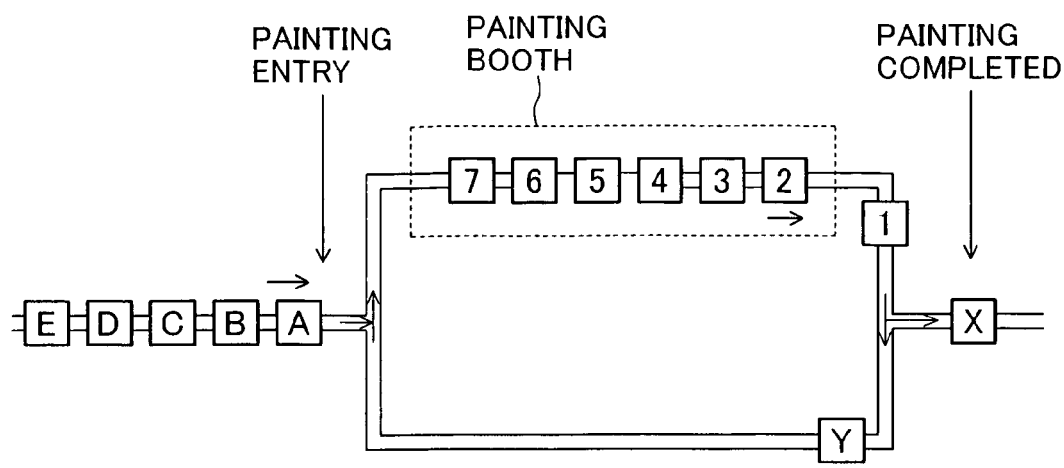

FIG. 21

| No | BASIC VEHICLE SERIES | PAINT COLOR | LINE SECTION | OFFLINE DATE | SPEC1 | SPEC2 | No. FOR TRACKING |
|---|---|---|---|---|---|---|---|
| 1 | S | RED | 111111 | 20010830 | CD | | S1 |
| 2 | S | RED | 111111 | 20010830 | CD | | S2 |
| 3 | S | WHITE | 111111 | 20010830 | CD | | S3 |
| 4 | S | BLUE | 111111 | 20010830 | CD | | S4 |
| 5 | S | RED | 111111 | 20010830 | CD | | S5 |
| 6 | S | WHITE | 111111 | 20010830 | CD | | S6 |
| 7 | S | WHITE | 111111 | 20010830 | CAR NAVIGATION UNIT | | S7 |
| 8 | S | YELLOW | 111111 | 20010830 | CAR NAVIGATION UNIT | | S8 |
| 9 | M | BLACK | 311121 | 20010830 | CD | | M9 |
| 10 | M | RED | 311121 | 20010830 | CD | | M10 |
| 11 | M | DARK BLUE | 311121 | 20010830 | CD | | M11 |
| 12 | M | BLUE | 311121 | 20010830 | CD | | M12 |
| 13 | M | BLACK | 311121 | 20010830 | 4WD | | M13 |
| 14 | M | DARK BLUE | 311121 | 20010830 | 4WD | | M14 |
| 15 | M | RED BLACK | 311121 | 20010830 | 4WD | 2TONE | M15 |
| 16 | M | BLUE | 311121 | 20010830 | 4WD | | M16 |
| 17 | R | RED | 333333 | 20010830 | CD | | R17 |
| 18 | R | SILVER | 333333 | 20010830 | CAR NAVIGATION UNIT | | R18 |
| 19 | R | RED | 333333 | 20010830 | CAR NAVIGATION UNIT | | R19 |
| 20 | R | RED | 333333 | 20010830 | CAR NAVIGATION UNIT | | R20 |
| 21 | R | RED | 333333 | 20010830 | CAR NAVIGATION UNIT | | R21 |

FIG.22

| LINE SECTION | MONTH | POINT NAME | 24D | 24N | 25D | 25N | 26D | 26N | 27D | 27N | 28D | 28N | 29D | 29N | 30D | 30N | 31D | 31N |
|---|---|---|---|---|---|---|---|---|---|---|---|---|---|---|---|---|---|---|
| 111111 | 08 | SETUP | ∞ | 0 | ∞ | 0 | 0 | 0 | ∞ | 0 | ∞ | 0 | ∞ | 0 | ∞ | 0 | ∞ | 0 |
| 311121 | 08 | SETUP | ∞ | 0 | ∞ | 0 | 0 | 0 | ∞ | 0 | ∞ | 0 | ∞ | 0 | ∞ | 0 | ∞ | 0 |
| 333333 | 08 | SETUP | ∞ | 0 | ∞ | 0 | 0 | 0 | ∞ | 0 | ∞ | 0 | ∞ | 0 | ∞ | 0 | ∞ | 0 |
| 111111 | 08 | BODY COMPLETION | ∞ | 0 | ∞ | 0 | 0 | 0 | ∞ | 0 | ∞ | 0 | ∞ | 0 | ∞ | 0 | ∞ | 0 |
| 311121 | 08 | BODY COMPLETION | ∞ | 0 | ∞ | 0 | 0 | 0 | ∞ | 0 | ∞ | 0 | ∞ | 0 | ∞ | 0 | ∞ | 0 |
| 333333 | 08 | BODY COMPLETION | ∞ | 0 | ∞ | 0 | 0 | 0 | ∞ | 0 | ∞ | 0 | ∞ | 0 | ∞ | 0 | ∞ | 0 |
| 111111 | 08 | PAINTING COMPLETION | ∞ | 0 | ∞ | 0 | 0 | 0 | ∞ | 0 | ∞ | 0 | ∞ | 0 | ∞ | 0 | ∞ | 0 |
| 311121 | 08 | PAINTING COMPLETION | ∞ | 0 | ∞ | 0 | 0 | 0 | ∞ | 0 | ∞ | 0 | ∞ | 0 | ∞ | 0 | ∞ | 0 |
| 333333 | 08 | PAINTING COMPLETION | ∞ | 0 | ∞ | 0 | 0 | 0 | ∞ | 0 | ∞ | 0 | ∞ | 0 | ∞ | 0 | ∞ | 0 |
| 111111 | 08 | ASSEMBLY ENTRY | ∞ | 0 | ∞ | 0 | 0 | 0 | ∞ | 0 | ∞ | 0 | ∞ | 0 | ∞ | 0 | ∞ | 0 |
| 311121 | 08 | ASSEMBLY ENTRY | ∞ | 0 | ∞ | 0 | 0 | 0 | ∞ | 0 | ∞ | 0 | ∞ | 0 | ∞ | 0 | ∞ | 0 |
| 333333 | 08 | ASSEMBLY ENTRY | ∞ | 0 | ∞ | 0 | 0 | 0 | ∞ | 0 | ∞ | 0 | ∞ | 0 | ∞ | 0 | ∞ | 0 |
| 111111 | 08 | OFFLINE | ∞ | 0 | ∞ | 0 | 0 | 0 | ∞ | 0 | ∞ | 0 | ∞ | 0 | ∞ | 0 | ∞ | 0 |
| 311121 | 08 | OFFLINE | ∞ | 0 | ∞ | 0 | 0 | 0 | ∞ | 0 | ∞ | 0 | ∞ | 0 | ∞ | 0 | ∞ | 0 |
| 333333 | 08 | OFFLINE | ∞ | 0 | ∞ | 0 | 0 | 0 | ∞ | 0 | ∞ | 0 | ∞ | 0 | ∞ | 0 | ∞ | 0 |
| 111111 | 08 | FINAL COMPLETION | ∞ | 0 | ∞ | 0 | 0 | 0 | ∞ | 0 | ∞ | 0 | ∞ | 0 | ∞ | 0 | ∞ | 0 |
| 311121 | 08 | FINAL COMPLETION | ∞ | 0 | ∞ | 0 | 0 | 0 | ∞ | 0 | ∞ | 0 | ∞ | 0 | ∞ | 0 | ∞ | 0 |
| 333333 | 08 | FINAL COMPLETION | ∞ | 0 | ∞ | 0 | 0 | 0 | ∞ | 0 | ∞ | 0 | ∞ | 0 | ∞ | 0 | ∞ | 0 |

FIG.23

| LINE SECTION | MONTH | POINT NAME | 24D | 24N | 25D | 25N | 26D | 26N | 27D | 27N | 28D | 28N | 29D | 29N | 30D | 30N | 31D | 31N |
|---|---|---|---|---|---|---|---|---|---|---|---|---|---|---|---|---|---|---|
| 111111 | 08 | BODY | 8 | 0 | 8 | 0 | 0 | 0 | 8 | 0 | 8 | 0 | 8 | 0 | 8 | 0 | 8 | 0 |
| 311121 | 08 | BODY | 8 | 0 | 8 | 0 | 0 | 0 | 8 | 0 | 8 | 0 | 8 | 0 | 8 | 0 | 8 | 0 |
| 333333 | 08 | BODY | 8 | 0 | 8 | 0 | 0 | 0 | 8 | 0 | 8 | 0 | 8 | 0 | 8 | 0 | 8 | 0 |
| 111111 | 08 | PAINTING | 8 | 0 | 8 | 0 | 0 | 0 | 8 | 0 | 8 | 0 | 8 | 0 | 8 | 0 | 8 | 0 |
| 311121 | 08 | PAINTING | 8 | 0 | 8 | 0 | 0 | 0 | 8 | 0 | 8 | 0 | 8 | 0 | 8 | 0 | 8 | 0 |
| 333333 | 08 | PAINTING | 8 | 0 | 8 | 0 | 0 | 0 | 8 | 0 | 8 | 0 | 8 | 0 | 8 | 0 | 8 | 0 |
| 111111 | 08 | PBS | 8 | 0 | 8 | 0 | 0 | 0 | 8 | 0 | 8 | 0 | 8 | 0 | 8 | 0 | 8 | 0 |
| 311121 | 08 | PBS | 8 | 0 | 8 | 0 | 0 | 0 | 8 | 0 | 8 | 0 | 8 | 0 | 8 | 0 | 8 | 0 |
| 333333 | 08 | PBS | 8 | 0 | 8 | 0 | 0 | 0 | 8 | 0 | 8 | 0 | 8 | 0 | 8 | 0 | 8 | 0 |
| 111111 | 08 | ASSEMBLY | 8 | 0 | 8 | 0 | 0 | 0 | 8 | 0 | 8 | 0 | 8 | 0 | 8 | 0 | 8 | 0 |
| 311121 | 08 | ASSEMBLY | 8 | 0 | 8 | 0 | 0 | 0 | 8 | 0 | 8 | 0 | 8 | 0 | 8 | 0 | 8 | 0 |
| 333333 | 08 | ASSEMBLY | 8 | 0 | 8 | 0 | 0 | 0 | 8 | 0 | 8 | 0 | 8 | 0 | 8 | 0 | 8 | 0 |
| 111111 | 08 | FINAL | 8 | 0 | 8 | 0 | 0 | 0 | 8 | 0 | 8 | 0 | 8 | 0 | 8 | 0 | 8 | 0 |
| 311121 | 08 | FINAL | 8 | 0 | 8 | 0 | 0 | 0 | 8 | 0 | 8 | 0 | 8 | 0 | 8 | 0 | 8 | 0 |
| 333333 | 08 | FINAL | 8 | 0 | 8 | 0 | 0 | 0 | 8 | 0 | 8 | 0 | 8 | 0 | 8 | 0 | 8 | 0 |

FIG.24

| POINT | 1 | | | 2 | | | 3 | | | 4 | | | 5 | | | 6 | | |
|---|---|---|---|---|---|---|---|---|---|---|---|---|---|---|---|---|---|---|
| SPEC | WEIGHT | Min | Max | WEIGHT | Min | Max | WEIGHT | Min | Max | WEIGHT | Min | Max | WEIGHT | Min | Max | WEIGHT | Min | Max |
| CD | | | | | | | | | | 5 | | | | | | | | |
| CAR NAVIGATION UNIT | | | | | | | | | | 5 | | | | | | | | |

FIG.25

| SPEC | APPLIED LINE SECTION | MODIFICATION TIME (Min) |
|---|---|---|
| 2TONE | -11--- | 120 |

FIG.26

| VEHICLE SERIES | PAINT COLOR | LINE SECTION | SETUP | BODY COMPLETION | PAINTING COMPLETION | ASSEMBLY ENTRY | OFFLINE | FINAL COMPLETION | SPEC1 | SPEC2 |
|---|---|---|---|---|---|---|---|---|---|---|
| S | RED | 111111 | 8/24 17:00 | 8/25 16:30 | 8/28 16:30 | 8/29 17:00 | 8/30 17:00 | 8/31 16:30 | CD | |
| S | RED | 111111 | 8/24 16:00 | 8/25 15:30 | 8/28 15:30 | 8/29 16:00 | 8/30 16:00 | 8/31 15:30 | CD | |
| S | WHITE | 111111 | 8/24 12:00 | 8/25 12:00 | 8/28 11:30 | 8/29 12:00 | 8/30 12:00 | 8/31 11:30 | CD | |
| S | BLUE | 111111 | 8/24 10:00 | 8/25 09:30 | 8/28 09:30 | 8/29 10:00 | 8/30 10:00 | 8/31 09:30 | CD | |
| S | WHITE | 111111 | 8/24 14:00 | 8/25 13:30 | 8/28 13:30 | 8/29 14:00 | 8/30 14:00 | 8/31 13:30 | CD | |
| S | WHITE | 111111 | 8/24 09:00 | 8/25 08:30 | 8/28 08:30 | 8/29 09:00 | 8/30 09:00 | 8/31 08:30 | CD | |
| S | BLUE | 111111 | 8/24 15:00 | 8/25 14:30 | 8/28 14:30 | 8/29 15:00 | 8/30 15:00 | 8/31 14:30 | CAR NAVI-GATION UNIT | |
| S | YELLOW | 111111 | 8/24 11:00 | 8/25 11:00 | 8/28 10:30 | 8/29 11:00 | 8/30 11:00 | 8/31 10:30 | CAR NAVI-GATION UNIT | |
| M | BLACK | 311121 | 8/24 15:30 | 8/25 16:00 | 8/28 16:00 | 8/29 16:00 | 8/30 16:00 | 8/31 16:00 | CD | |
| M | RED | 311121 | 8/24 13:30 | 8/25 14:00 | 8/28 14:00 | 8/29 14:00 | 8/30 14:00 | 8/31 14:00 | CD | |
| M | DARK BLUE | 311121 | 8/24 09:30 | 8/25 10:00 | 8/28 10:00 | 8/29 10:00 | 8/30 10:00 | 8/31 10:00 | CD | |
| M | BLUE | 311121 | 8/24 11:00 | 8/25 11:30 | 8/28 11:00 | 8/29 11:00 | 8/30 11:00 | 8/31 11:00 | CD | |
| M | BLACK | 311121 | 8/24 16:30 | 8/25 17:00 | 8/28 17:00 | 8/29 17:00 | 8/30 17:00 | 8/31 17:00 | 4WD | |
| M | DARK BLUE | 311121 | 8/24 14:30 | 8/25 15:00 | 8/28 15:00 | 8/29 15:00 | 8/30 15:00 | 8/31 15:00 | 4WD | |
| M | RED BLACK | 311121 | 8/24 10:30 | 8/25 10:30 | 8/28 12:00 | 8/29 12:00 | 8/30 12:00 | 8/31 12:00 | 4WD | 2TONE |
| M | BLUE | 311121 | 8/24 08:30 | 8/25 09:00 | 8/28 09:00 | 8/29 09:00 | 8/30 09:00 | 8/31 09:00 | 4WD | |
| R | RED | 333333 | 8/24 09:00 | 8/25 09:00 | 8/28 09:00 | 8/29 09:00 | 8/30 09:00 | 8/31 09:00 | CD | |
| R | SILVER | 333333 | 8/24 10:00 | 8/25 10:00 | 8/28 10:00 | 8/29 10:00 | 8/30 10:00 | 8/31 10:00 | CAR NAVI-GATION UNIT | |
| R | RED | 333333 | 8/24 12:00 | 8/25 12:00 | 8/28 12:00 | 8/29 12:00 | 8/30 12:00 | 8/31 12:00 | CAR NAVI-GATION UNIT | |
| R | RED | 333333 | 8/24 15:00 | 8/25 15:00 | 8/28 15:00 | 8/29 15:00 | 8/30 15:00 | 8/31 15:00 | CAR NAVI-GATION UNIT | |
| R | RED | 333333 | 8/24 17:00 | 8/25 17:00 | 8/28 17:00 | 8/29 17:00 | 8/30 17:00 | 8/31 17:00 | CAR NAVI-GATION UNIT | |
| R | PINK | 333333 | 8/24 11:30 | 8/25 11:00 | 8/28 11:00 | 8/29 11:00 | 8/30 11:00 | 8/31 11:00 | CD | |
| R | SILVER | 333333 | 8/24 16:00 | 8/25 16:00 | 8/28 16:00 | 8/29 16:00 | 8/30 16:00 | 8/31 16:00 | CD | |
| R | SILVER | 333333 | 8/24 14:00 | 8/25 14:00 | 8/28 14:00 | 8/29 14:00 | 8/30 14:00 | 8/31 14:00 | CD | |

FIG. 27

| | VEHICLE SERIES | PAINT COLOR | LINE SECTION | OFFLINE | SPEC1 | SPEC2 |
|---|---|---|---|---|---|---|
| 1 | S | RED | 111111 | 8/30 17:00 | CD | |
| 2 | S | RED | 111111 | 8/30 16:00 | CD | |
| 3 | S | WHITE | 111111 | 8/30 12:00 | CD | |
| 4 | S | BLUE | 111111 | 8/30 10:00 | CD | |
| 5 | S | WHITE | 111111 | 8/30 14:00 | CD | |
| 6 | S | WHITE | 111111 | 8/30 09:00 | CD | |
| 7 | S | BLUE | 111111 | 8/30 15:00 | CAR NAVI-GATION UNIT | |
| 8 | S | YELLOW | 111111 | 8/30 11:00 | CAR NAVI-GATION UNIT | |
| 9 | M | BLACK | 311121 | 8/30 16:00 | CD | |
| 10 | M | RED | 311121 | 8/30 14:00 | CD | |
| 11 | M | DARK BLUE | 311121 | 8/30 10:00 | CD | |
| 12 | M | BLUE | 311121 | 8/30 11:00 | CD | |
| 13 | M | BLACK | 311121 | 8/30 17:00 | 4WD | |
| 14 | M | DARK BLUE | 311121 | 8/30 15:00 | 4WD | |
| 15 | M | RED BLACK | 311121 | 8/30 12:00 | 4WD | 2TONE |
| 16 | M | BLUE | 311121 | 8/30 09:00 | 4WD | |
| 17 | R | RED | 333333 | 8/30 09:00 | CD | |
| 18 | R | SILVER | 333333 | 8/30 10:00 | CAR NAVI-GATION UNIT | |
| 19 | R | RED | 333333 | 8/30 12:00 | CD | |
| 20 | R | RED | 333333 | 8/30 15:00 | CAR NAVI-GATION UNIT | |
| 21 | R | PINK | 333333 | 8/30 17:00 | CAR NAVI-GATION UNIT | |
| 22 | R | PINK | 333333 | 8/30 11:00 | CD | |
| 23 | R | SILVER | 333333 | 8/30 16:00 | CD | |
| 24 | R | SILVER | 333333 | 8/30 14:00 | CD | |

| | | | | |
|---|---|---|---|---|
| 6 | S | WHITE | 111111 | 8/30 09:00 | CD |
| 4 | S | BLUE | 111111 | 8/30 10:00 | CD |
| 8 | S | YELLOW | 111111 | 8/30 11:00 | CAR NAVI-GATION UNIT |
| 3 | S | WHITE | 111111 | 8/30 12:00 | CD |
| 5 | S | WHITE | 111111 | 8/30 14:00 | CD |
| 7 | S | BLUE | 111111 | 8/30 15:00 | CAR NAVI-GATION UNIT |
| 2 | S | RED | 111111 | 8/30 16:00 | CD |
| 1 | S | RED | 111111 | 8/30 17:00 | CD |

| | | | | |
|---|---|---|---|---|
| 16 | M | BLUE | 311121 | 8/30 09:00 | 4WD |
| 11 | M | DARK BLUE | 311121 | 8/30 10:00 | CD |
| 12 | M | BLUE | 311121 | 8/30 11:00 | CD |
| 15 | M | RED BLACK | 311121 | 8/30 12:00 | 4WD |
| 10 | M | RED | 311121 | 8/30 14:00 | CD |
| 14 | M | DARK BLUE | 311121 | 8/30 15:00 | 4WD |
| 9 | M | BLACK | 311121 | 8/30 16:00 | CD |
| 13 | M | BLACK | 311121 | 8/30 17:00 | 4WD |

| | | | | |
|---|---|---|---|---|
| 17 | R | RED | 333333 | 8/30 09:00 | CD |
| 18 | R | SILVER | 333333 | 8/30 10:00 | CAR NAVI-GATION UNIT |
| 22 | R | PINK | 333333 | 8/30 11:00 | CD |
| 19 | R | RED | 333333 | 8/30 12:00 | CD |
| 24 | R | SILVER | 333333 | 8/30 14:00 | CD |
| 20 | R | RED | 333333 | 8/30 15:00 | CAR NAVI-GATION UNIT |
| 23 | R | SILVER | 333333 | 8/30 16:00 | CD |
| 21 | R | RED | 333333 | 8/30 17:00 | CAR NAVI-GATION UNIT |

FIG.28

|  | ASSEMBLY ENTRY LINE 1 | ASSEMBLY ENTRY LINE 2 | ASSEMBLY ENTRY LINE 3 |
|---|---|---|---|
| 8/29 9:00 | S6 | M16 | R17 |
| 8/29 10:00 | S4 | M11 | R18 |
| 8/29 11:00 | S8 | M12 | R22 |
| 8/29 12:00 | S3 | M15 | R19 |
| 8/29 13:00 |  |  |  |
| 8/29 14:00 | S5 | M10 | R24 |
| 8/29 15:00 | S7 | M14 | R20 |
| 8/29 16:00 | S2 | M9 | R23 |
| 8/29 17:00 | S1 | M13 | R21 |

|  | OFF-LINE 1 | OFF-LINE 2 | OFF-LINE 3 |
|---|---|---|---|
| 8/30 9:00 | S6 | M16 | R17 |
| 8/30 10:00 | S4 | M11 | R18 |
| 8/30 11:00 | S8 | M12 | R22 |
| 8/30 12:00 | S3 | M15 | R19 |
| 8/30 13:00 |  |  |  |
| 8/30 14:00 | S5 | M10 | R24 |
| 8/30 15:00 | S7 | M14 | R20 |
| 8/30 16:00 | S2 | M9 | R23 |
| 8/30 17:00 | S1 | M13 | R21 |

FIG.29

| | PAINTING COMPLETION LINE 1 | PAINTING COMPLETION LINE 2 |
|---|---|---|
| 8/28 8:30 | S6 | |
| 8/28 9:00 | M16 | R17 |
| 8/28 9:30 | S4 | |
| 8/28 10:00 | M11 | R18 |
| 8/28 10:30 | S8 | |
| 8/28 11:00 | M12 | R22 |
| 8/28 11:30 | S3 | |
| 8/28 12:00 | M15 | R19 |
| 8/28 12:30 | | |
| 8/28 13:00 | | |
| 8/28 13:30 | S5 | |
| 8/28 14:00 | M10 | R24 |
| 8/28 14:30 | S7 | |
| 8/28 15:00 | M14 | R20 |
| 8/28 15:30 | S2 | |
| 8/28 16:00 | M9 | R23 |
| 8/28 16:30 | S1 | |
| 8/28 17:00 | M13 | R21 |
| 8/28 17:30 | | |

| | ASSEMBLY ENTRY LINE 1 | ASSEMBLY ENTRY LINE 2 | ASSEMBLY ENTRY LINE 3 |
|---|---|---|---|
| 8/29 9:00 | S6 | M16 | R17 |
| 8/29 10:00 | S4 | M11 | R18 |
| 8/29 11:00 | S8 | M12 | R22 |
| 8/29 12:00 | S3 | M15 | R19 |
| 8/29 13:00 | | | |
| 8/29 14:00 | S5 | M10 | R24 |
| 8/29 15:00 | S7 | M14 | R20 |
| 8/29 16:00 | S2 | M9 | R23 |
| 8/29 17:00 | S1 | M13 | R21 |

FIG.30

| | BODY COMPLETION LINE 1 | BODY COMPLETION LINE 3 | PAINTING COMPLETION LINE 1 | PAINTING COMPLETION LINE 3 |
|---|---|---|---|---|
| 8/25 8:30 | S6 | | | |
| 8/25 9:00 | M16 | R17 | | |
| 8/25 9:30 | S4 | | | |
| 8/25 10:00 | M11 | R18 | | |
| 8/25 10:30 | M15 | | | |
| 8/25 11:00 | S8 | R22 | | |
| 8/25 11:30 | M12 | | | |
| 8/25 12:00 | S3 | R19 | | |
| 8/25 12:30 | | | | |
| 8/25 13:00 | | | | |
| 8/25 13:30 | S5 | | | |
| 8/25 14:00 | M10 | R24 | | |
| 8/25 14:30 | S7 | | | |
| 8/25 15:00 | M14 | R20 | | |
| 8/25 15:30 | S2 | | | |
| 8/25 16:00 | M9 | R23 | | |
| 8/25 16:30 | S1 | | | |
| 8/25 17:00 | M13 | R21 | | |

| | BODY COMPLETION LINE 1 | BODY COMPLETION LINE 3 | PAINTING COMPLETION LINE 1 | PAINTING COMPLETION LINE 3 |
|---|---|---|---|---|
| 8/28 8:30 | | | S6 | |
| 8/28 9:00 | | | M16 | R17 |
| 8/28 9:30 | | | S4 | |
| 8/28 10:00 | | | M11 | R18 |
| 8/28 10:30 | | | S8 | |
| 8/28 11:00 | | | M12 | R22 |
| 8/28 11:30 | | | S3 | |
| 8/28 12:00 | | | M15 | R19 |
| 8/28 12:30 | | | | |
| 8/28 13:00 | | | | |
| 8/28 13:30 | | | S5 | |
| 8/28 14:00 | | | M10 | R24 |
| 8/28 14:30 | | | S7 | |
| 8/28 15:00 | | | M14 | R20 |
| 8/28 15:30 | | | S2 | |
| 8/28 16:00 | | | M9 | R23 |
| 8/28 16:30 | | | S1 | |
| 8/28 17:00 | | | M13 | R21 |

FIG.31

| | SETUP 1 | SETUP 3 | BODY COM-PLETION LINE 1 | BODY COM-PLETION LINE 3 |
|---|---|---|---|---|
| 8/24 8:30 | | M16 | | |
| 8/24 9:00 | S6 | R17 | | |
| 8/24 9:30 | | M11 | | |
| 8/24 10:00 | S4 | R18 | | |
| 8/24 10:30 | | M15 | | |
| 8/24 11:00 | S8 | M12 | | |
| 8/24 11:30 | | R22 | | |
| 8/24 12:00 | S3 | R19 | | |
| 8/24 12:30 | | | | |
| 8/24 13:00 | | | | |
| 8/24 13:30 | | M10 | | |
| 8/24 14:00 | S5 | R24 | | |
| 8/24 14:30 | | M14 | | |
| 8/24 15:00 | S7 | R20 | | |
| 8/24 15:30 | | M9 | | |
| 8/24 16:00 | S2 | R23 | | |
| 8/24 16:30 | | M13 | | |
| 8/24 17:00 | S1 | R21 | | |
| 8/25 8:30 | | | S6 | |
| 8/25 9:00 | | | M16 | R17 |
| 8/25 9:30 | | | S4 | |
| 8/25 10:00 | | | M11 | R18 |
| 8/25 10:30 | | | M15 | |
| 8/25 11:00 | | | S8 | R22 |
| 8/25 11:30 | | | M12 | |
| 8/25 12:00 | | | S3 | R19 |
| 8/25 12:30 | | | | |
| 8/25 13:00 | | | | |
| 8/25 13:30 | | | S5 | |
| 8/25 14:00 | | | M10 | R24 |
| 8/25 14:30 | | | S7 | |
| 8/25 15:00 | | | M14 | R20 |
| 8/25 15:30 | | | S2 | |
| 8/25 16:00 | | | M9 | R23 |
| 8/25 16:30 | | | S1 | |
| 8/25 17:00 | | | M13 | R21 |

FIG.32

| | OFF-LINE 1 | OFF-LINE 2 | OFF-LINE 3 | FINAL COMPLETION 1 | FINAL COMPLETION 2 |
|---|---|---|---|---|---|
| 8/30 8:30 | | | | | |
| 8/30 9:00 | S6 | M16 | R17 | | |
| 8/30 9:30 | | | | | |
| 8/30 10:00 | S4 | M11 | R18 | | |
| 8/30 10:30 | | | | | |
| 8/30 11:00 | S8 | M12 | R22 | | |
| 8/30 11:30 | | | | | |
| 8/30 12:00 | S3 | M15 | R19 | | |
| 8/30 12:30 | | | | | |
| 8/30 13:00 | | | | | |
| 8/30 13:30 | | | | | |
| 8/30 14:00 | S5 | M10 | R24 | | |
| 8/30 14:30 | | | | | |
| 8/30 15:00 | S7 | M14 | R20 | | |
| 8/30 15:30 | | | | | |
| 8/30 16:00 | S2 | M9 | R23 | | |
| 8/30 16:30 | | | | | |
| 8/30 17:00 | S1 | M13 | R21 | | |
| 8/31 8:30 | | | | S6 | |
| 8/31 9:00 | | | | M16 | R17 |
| 8/31 9:30 | | | | S4 | |
| 8/31 10:00 | | | | M11 | R18 |
| 8/31 10:30 | | | | S8 | |
| 8/31 11:00 | | | | M12 | R22 |
| 8/31 11:30 | | | | S3 | |
| 8/31 12:00 | | | | M15 | R19 |
| 8/31 12:30 | | | | | |
| 8/31 13:00 | | | | | |
| 8/31 13:30 | | | | S5 | |
| 8/31 14:00 | | | | M10 | R24 |
| 8/31 14:30 | | | | S7 | |
| 8/31 15:00 | | | | M14 | R20 |
| 8/31 15:30 | | | | S2 | |
| 8/31 16:00 | | | | M9 | R23 |
| 8/31 16:30 | | | | S1 | |
| 8/31 17:00 | | | | M13 | R21 |

US 7,577,485 B2

AUTOMOBILE MANUFACTURING LINE INPUT ORDER PLANNING APPARATUS

TECHNICAL FIELD

The present invention relates to a building sequence planning system for an automobile production line, which prepares a building sequence and a work sequence for each of plural processes. More particularly, the present invention relates to a building sequence planning system for placing an automobile into an automobile production line, which is suitable for use in the manufacturing industry employing a mixed line, typical in the automobile manufacturing industry.

BACKGROUND ART

In the automobile manufacturing industry, automobiles are generally manufactured through a plurality of processes, such as a body process (main and metal), a painting process (paint), an assembly process (trim), and a final test process (final). Inside each of those processes, respective stations are interconnected by rails, and vehicles are moved at equal intervals and at a constant speed, while a work load and a work time are different for each process. For increasing efficiency of an overall production line, it is required to decide a work sequence in the various processes without causing an extra vehicle to stand by between the processes and causing a change in the vehicle sequence, for example, so that respective lines constitute one continuous line.

Hitherto, a decision on a building sequence capable of meeting conditions in all the processes at the same time has been made based on manual work of a skilled person in charge of planning, because the decision requires specific know-how.

DISCLOSURE OF THE INVENTION

In a type of production line called a mixed line, the presence of branches and joints of lines makes it difficult to grasp the sequence of vehicles moving along respective lines at each work management point. Thus, the building sequence can be decided only by a skilled person having a thorough knowledge of all matters in the production line, such as operations in respective processes, line characteristics, attributes of vehicles flowing along the line, and details of operations depending on specifications and options.

Further, the number of types of vehicles having different specifications and options has increased with the necessity of preparing various optional settings, etc. to satisfy diversification of consumer needs and to make vehicles of the relevant maker different from other maker's vehicles. This imposes an increased burden on the planning person, and an efficient building sequence cannot be decided in some cases.

It is an object of the present invention to provide a building sequence planning system for an automobile production line, which can provide an efficient building sequence.

(1) To achieve the above object, the present invention provides a building sequence planning system for an automobile production line. The system includes an input unit for inputting information of vehicles to be manufactured, a processing unit for deciding an optimum building sequence based on the vehicle information inputted through the input unit, and an output unit for externally outputting a building sequence schedule decided by the processing unit. The processing unit prepares a vehicle building sequence, determines a degree of dissatisfaction of the prepared building sequence, as a penalty value, in accordance with restriction conditions which are inputted through the input unit and are imposed when building the vehicles into work, and decides a building sequence with a minimum penalty by preparing a plurality of building sequences and determining the penalty value for each building sequence with respect to the restriction conditions.

With that construction, an efficient building sequence can be prepared.

(2) In (1) above, preferably, the restriction conditions include leveling distribution of vehicles having the same specifications, a minimum building interval of vehicles having particular specifications, and a maximum succeeding vehicle number and a minimum succeeding vehicle number in successive building of the vehicles when the number of vehicles successively loaded is taken into consideration.

(3) In (1) above, preferably, the processing unit propagates the building sequence in an offline process, which corresponds to an assembly completion process, to preceding and succeeding processes with lead-time shifting by employing the number of vehicles residing or accumulated between two processes, thereby deciding the building sequence for each of the preceding and succeeding processes.

(4) In (1) above, preferably, in a mixed line including branches and joints, the processing unit calculates a different lead time for each vehicle by employing the number of vehicles residing or accumulated between two processes, and propagates the building sequence to preceding and succeeding processes with lead-time shifting, thereby deciding the building sequence for each of the preceding and succeeding processes.

(5) In (3) above, preferably, for a vehicle which has to pass a line twice because of work for two-tone color painting, the lead time is modified by adding a time or the number of vehicles.

(6) In (1) above, preferably, the processing unit is capable of varying a weight used in the penalty calculation for each of specifications and options.

(7) In (1) above, preferably, the processing unit decides the building sequence with the minimum penalty by using an optimization method represented by a mutually coupled neural network or a genetic algorithm.

(8) In (1) above, preferably, the processing unit is capable of setting the restriction conditions per process for which the building sequence is decided.

(9) To achieve the above object, the present invention provides a building sequence planning system for an automobile production line. The system includes an input unit for inputting information of vehicles to be manufactured, a processing unit for deciding an optimum building sequence based on the vehicle information inputted through the input unit, and an output unit for externally outputting a building sequence schedule decided by the processing unit. The processing unit prepares a vehicle building sequence, determines a degree of dissatisfaction of the prepared building sequence, as a penalty value, in accordance with restriction conditions which are inputted through the input unit and are imposed when building the vehicles into work, and decides a building sequence with a minimum penalty by preparing a plurality of building sequences and determining the penalty value for each building sequence with respect to the restriction conditions. The processing unit propagates the building sequence in an offline process, which corresponds to an assembly completion process, to preceding and succeeding processes with lead-time shifting by employing the number of vehicles residing or accumulated between two processes, thereby deciding the building sequence for each of the preceding and succeeding processes.

With that construction, an efficient building sequence can be prepared.

(10) To achieve the above object, the present invention further provides a different building sequence planning system for an automobile production line. This system includes an input unit for inputting information of vehicles to be manufactured, a processing unit for deciding an optimum building sequence based on the vehicle information inputted through the input unit, and an output unit for externally outputting a building sequence schedule decided by the processing unit. The processing unit prepares a vehicle building sequence, and determines a degree of dissatisfaction of the prepared building sequence, as a penalty value, in accordance with restriction conditions which are inputted through the input unit and are imposed when building the vehicles into work. The restriction conditions include leveling distribution of vehicles having the same specifications, with a minimum building interval of vehicles having particular specifications, and a maximum succeeding vehicle number and a minimum succeeding vehicle number in successive building of the vehicles when the number of vehicles successively loaded, taken into consideration. The processing unit decides a building sequence with a minimum penalty by preparing a plurality of building sequences and determining the penalty value for each building sequence with respect to the restriction conditions. The processing unit propagates the building sequence in an offline process, which corresponds to an assembly completion process, to preceding and succeeding processes with lead-time shifting by employing the number of vehicles residing or accumulated between two processes, thereby deciding the building sequence for each of the preceding and succeeding processes.

With that construction, an efficient building sequence can be prepared.

(11) To achieve the above object, the present invention further provides yet another building sequence planning system for an automobile production line. This system includes an input unit for inputting information of vehicles to be manufactured, a processing unit for deciding an optimum building sequence based on the vehicle information inputted through the input unit, and an output unit for externally outputting a building sequence schedule decided by the processing unit. The processing unit prepares a vehicle building sequence, and determines a degree of dissatisfaction of the prepared building sequence, as a penalty value, in accordance with restriction conditions which are inputted through the input unit and are imposed when building the vehicles into work. The restriction conditions include leveling in distribution of vehicles having the same specifications, with a minimum building interval of vehicles having particular specifications, and a maximum succeeding vehicle number and a minimum succeeding vehicle number in successive building of the vehicles when the number of vehicles successively loaded, taken into consideration. The processing unit decides a building sequence with a minimum penalty by preparing a plurality of building sequences and determining the penalty value for each building sequence with respect to the restriction conditions.

With this construction, an efficient building sequence can be prepared.

BRIEF DESCRIPTION OF THE DRAWINGS

FIG. 6 is an illustration for explaining one example of restriction conditions in preparing the building sequence, which are set for specifications and options and are used in the building sequence planning system for the automobile production line according to one embodiment of the present invention.

FIG. 11 is an illustration for explaining the building sequence preparing process executed in the building sequence planning system for the automobile production line according to one embodiment of the present invention.

FIG. 12 is a table for explaining an evaluation value calculating process executed in the building sequence planning system for the automobile production line according to one embodiment of the present invention.

FIG. 13 is a table for explaining an evaluation value calculating process executed in the building sequence planning system for the automobile production line according to one embodiment of the present invention.

FIG. 14 is a table for explaining an evaluation value calculating process executed in the building sequence planning system for the automobile production line according to one embodiment of the present invention.

FIG. 15 is a table for explaining an evaluation value calculating process executed in the building sequence planning system for the automobile production line according to one embodiment of the present invention.

FIG. 18 is an illustration for explaining a lead-time shifting process executed in the building sequence planning system for the automobile production line according to one embodiment of the present invention.

FIG. 19 is an illustration for explaining a lead-time shifting process executed in the building sequence planning system for the automobile production line according to one embodiment of the present invention.

FIG. 21 is a table for explaining one example of information inputted to the building sequence planning system for the automobile production line according to one embodiment of the present invention.

FIG. 22 is a table for explaining one example of information inputted to the building sequence planning system for the automobile production line according to one embodiment of the present invention.

FIG. 23 is a table for explaining one example of information inputted to the building sequence planning system for the automobile production line according to one embodiment of the present invention.

FIG. 24 is a table for explaining one example of information inputted to the building sequence planning system for the automobile production line according to one embodiment of the present invention.

FIG. 25 is a table for explaining one example of information inputted to the building sequence planning system for the automobile production line according to one embodiment of the present invention.

FIG. 26 is a table for explaining one example of successive building sequence information prepared by the building sequence planning system for the automobile production line according to one embodiment of the present invention.

FIG. 27 is a table for explaining one example of successive building sequence information prepared by the building sequence planning system for the automobile production line according to one embodiment of the present invention.

FIG. 28 is a table for explaining one example of successive building sequence information prepared by the building sequence planning system for the automobile production line according to one embodiment of the present invention.

FIG. 29 is a table for explaining one example of successive building sequence information prepared by the building sequence planning system for the automobile production line according to one embodiment of the present invention.

FIG. 30 is a table for explaining one example of successive building sequence information prepared by the building sequence planning system for the automobile production line according to one embodiment of the present invention.

FIG. 31 is a table for explaining one example of successive building sequence information prepared by the building sequence planning system for the automobile production line according to one embodiment of the present invention.

FIG. 32 is a table for explaining one example of successive building sequence information prepared by the building sequence planning system for the automobile production line according to one embodiment of the present invention.

BEST MODE FOR CARRYING OUT THE INVENTION

The construction and operation of a building sequence planning system for an automobile production line according to one embodiment of the present invention will be described below with reference to FIGS. 1 to 32.

First, the overall construction of the building sequence planning system for the automobile production line according to one embodiment of the present invention will be described with reference to FIGS. 1 and 2.

Figure 1:
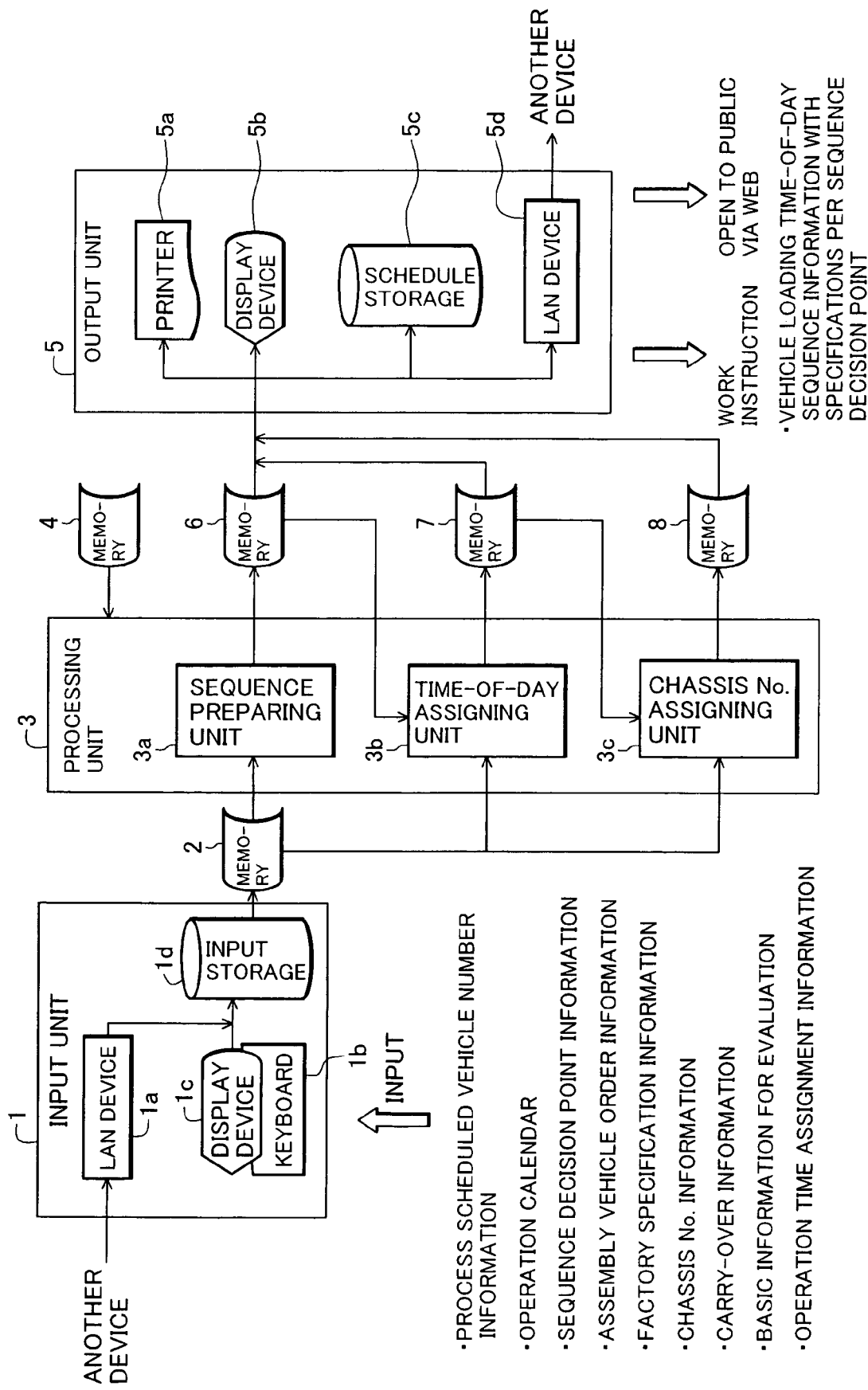
FIG. 1 is a system block diagram showing an overall construction of a building sequence planning system for an automobile production line according to one embodiment of the present invention.
Figure 2:
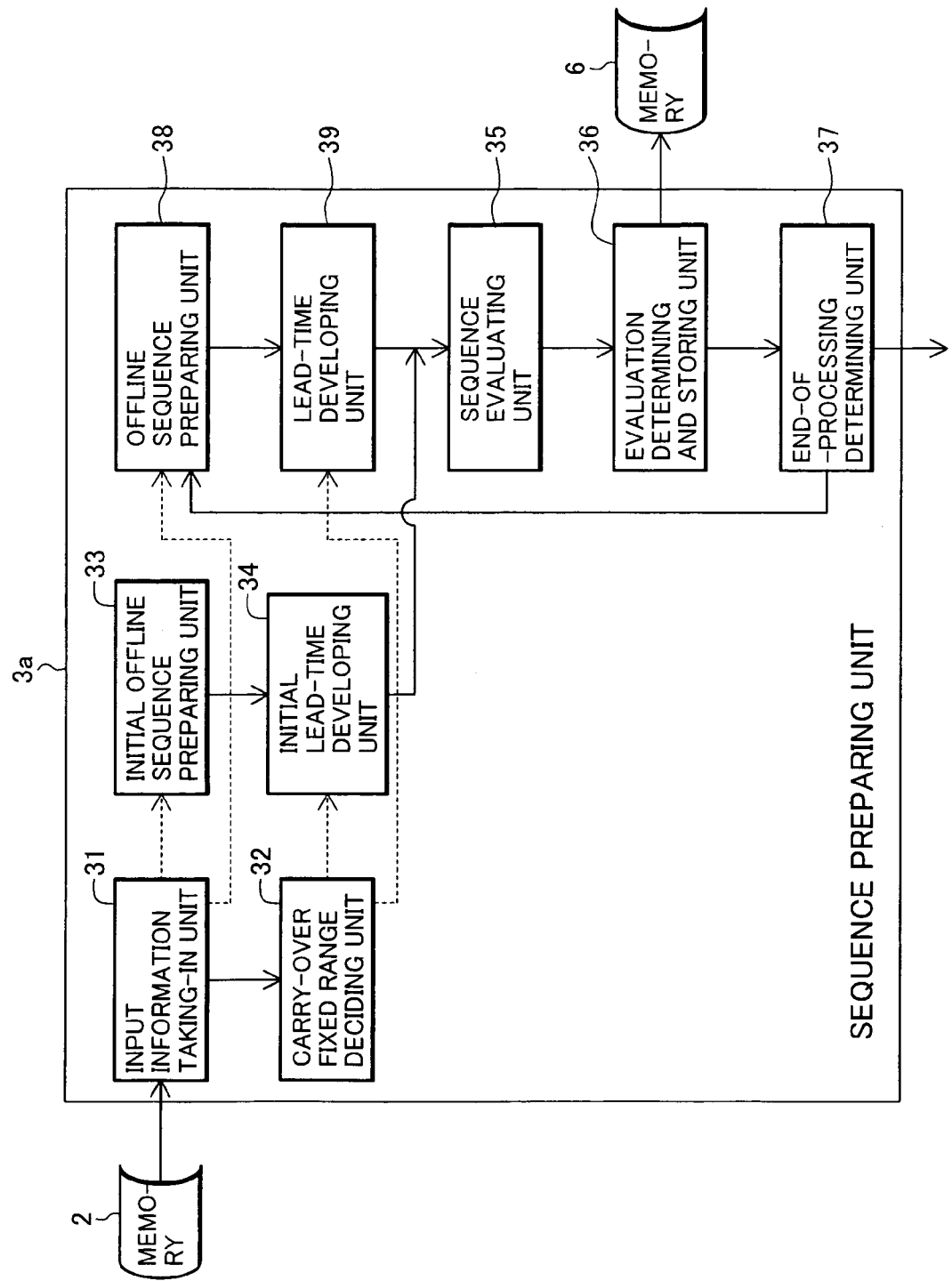
FIG. 2 is a system block diagram showing a detailed construction of a principal part of the building sequence planning system for the automobile production line, shown in FIG. 1, according to that embodiment.

FIG. 1 is a system block diagram showing the overall construction of the building sequence planning system for the automobile production line according to one embodiment of the present invention. FIG. 2 is a system block diagram showing a detailed construction of a principal part of the building sequence planning system for the automobile production line, shown in FIG. 1, according to this embodiment.

As shown in FIG. 1, the building sequence planning system for the automobile production line according to this embodiment comprises an input unit 1, a processing unit 3, an output unit 5, and memories 2, 4, 6, 7 and 8.

The input unit 1 comprises a LAN device 1a, a keyboard 1b, a display device 1c, and an input storage 1d. The input storage 1d stores therein information entered by using the keyboard 1b and the display device 1c, and information entered from another external device in accordance with communication procedures for the LAN device 1a or the like.

The information inputted through the input unit 1 contains, for example, the following items:

1) process scheduled vehicle number information per sequence decision point, i.e., daily manufactured vehicle number information per sequence decision point process, 2) operation calendar information for the sequence decision point processes, 3) sequence decision point information for processes for which the building sequence is to be prepared, 4) assembled vehicle order information as information regarding vehicles for which the building sequence is to be prepared, 5) factory specification information regarding, e.g., line and process layouts of a factory as a planning target, 6) chassis No. information regarding body number, 7) carry-over information, i.e., taking-over information resulting from actual work performed in accordance with a building sequence schedule previously prepared, 8) basic information for evaluation in preparing a building sequence with respect to specifications and options applied when the sequence is prepared, and 9) operation time assignment information taking into account operation or non-operation.

Those items of information entered through the keyboard 1b or the LAN device 1a are stored in the input storage 1d. The input information stored in the input storage 1d is transferred to the processing unit 3 via the memory 2.

The processing unit 3 prepares a building sequence schedule based on the input information from the input unit 1. The memory 4 stores a group of programs executed by the processing unit 3. The processing unit 3 executes necessary processing in accordance with the group of programs stored in the memory 4.

The processing unit 3 comprises a sequence preparing unit 3a, a time-of-day assigning unit 3b, and a chassis No. assigning unit 3c. The sequence preparing unit 3a prepares a successive building sequence for each process based on the input information. The prepared successive building sequence information is stored in the memory 6. The detailed construction of the sequence preparing unit 3a will be described later with reference to FIG. 2.

The time-of-day assigning unit 3b executes processing for assigning the time of day in the actual calendar to the successive building sequence information that is an output result of the sequence preparing unit 3a and is stored in the memory 6. The assigned actual-calendar information is stored in the memory 7.

The chassis No. assigning unit 3c assigns the chassis number (No.), i.e., the body management number, per vehicle in the successive building sequence that is stored in the memory 7 and is added with the time of day, thereby providing unique data. At the time when the chassis number is assigned, an end user is united. Data of each vehicle assigned with the chassis number is stored in the memory 8.

The output unit 5 comprises a printer 5a, a display device 5b, a schedule storage 5c, and a LAN device 5d. The output unit 5 is accessible to the memories 6, 7 and 8 in which the processing results of the sequence preparing unit 3a, the time-of-day assigning unit 3b, and the chassis No. assigning unit 3c are stored, and is capable of referring to the building sequence information, i.e., the processing result of the processing unit 3. Also, the output unit 5 outputs vehicle building time-of-day sequence information with specifications per sequence decision point. Further, the output unit 5 performs outputting of a work instruction, etc. to the printer 5a, display of data on the display device 5b such as a display, storing of data in the plan storage 5d such as a disk file, and a disclosure of data to another device in accordance with communication procedures for the LAN device or the like. In practice, data can be corrected through the display device 5b in a dialog way.

The construction of the sequence preparing unit 3a will be next described with reference to FIG. 2.

The sequence preparing unit 3a comprises an input information taking-in unit 31, a carry-over fixated range deciding unit 32, an initial offline sequence preparing unit 33, an initial lead-time developing unit 34, a sequence evaluating unit 35, an evaluation determining and storing unit 36, an end-of-processing determining unit 37, an offline sequence preparing unit 38, and a lead-time developing unit 39.

Figure 3:
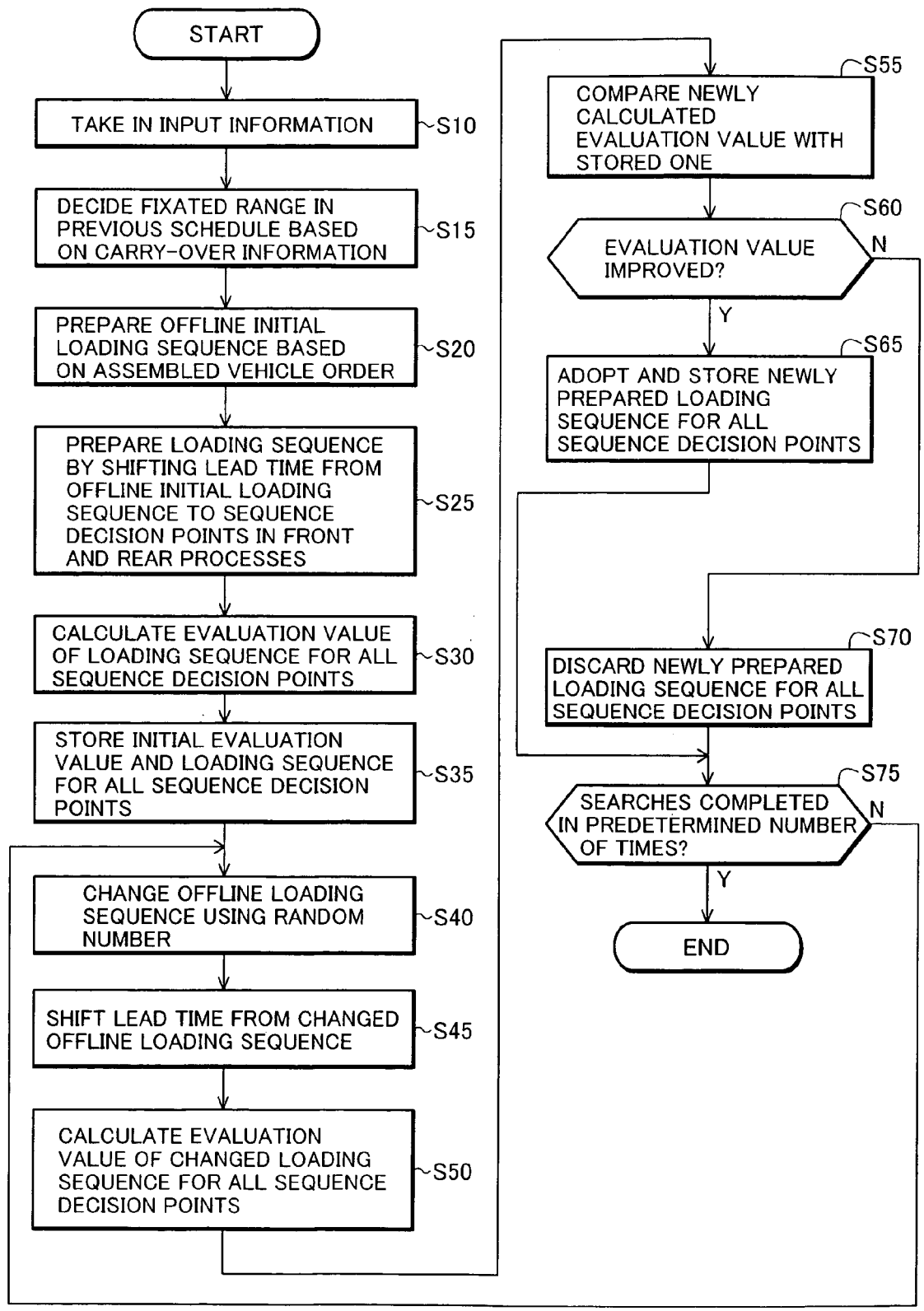
FIG. 3 is a flowchart of processing executed by a sequence preparing unit in the building sequence planning system for the automobile production line according to one embodiment of the present invention.

With reference to FIG. 3, a description is now made of the processing operation executed by the sequence preparing unit 3a in the building sequence planning system for the automobile production line according this embodiment.

FIG. 3 is a flowchart of the processing executed by the sequence preparing unit 3a in the building sequence planning system for the automobile production line according to one embodiment of the present invention.

In step s10, the input information taking-in unit 31 reads information from the input storage 1d of the input unit 1 and loads the information into the memory.

Then, in step s15, the carry-over fixated range deciding unit 32 compares carry-over information, i.e., information regarding vehicles for which work is not yet started in the building sequence schedule range previously outputted, with a building sequence schedule previously outputted, and fixates vehicles not designated by the carry-over information, i.e., vehicles for which work has been already started, in all the processes, thereby setting those vehicles not to be exchanged in sequence. Because work is performed from the head process, the carry-over information is instructed in a sequence decision point process at the head. The building sequence is fixated while tracking a designated vehicle toward downward processes from the head sequence decision point. Additionally, an interrupt is allowed for a vehicle that is to be manufactured in response to a newly received instruction.

Then, in step s20, the initial offline sequence preparing unit 33 prepares an initial building sequence at an offline point (so called because a vehicle having completed assembly leaves the line here) where an assembly process is completed. While the initial building sequence may be at random, suitability of an initial array sequence affects the number of searches until an array sequence as an optimum building sequence is obtained. In practice, an initial array sequence is prepared taking specifications and options into consideration so that the number of convergences until reaching the optimum building sequence is reduced.

Then, in step s25, the initial lead-time developing unit 34 shifts a lead time for modification based on the initial array sequence prepared by the initial offline sequence preparing unit 33, and develops the sequence to preceding and succeeding target processes for which the sequence is to be prepared. Details of the lead-time shifting and the lead-time modification will be described later with reference to FIGS. 16 to 20.

Then, in step s30, the sequence evaluating unit 35 evaluates the building sequence for all the processes, which has been prepared by the initial lead-time developing unit 34. The evaluation in this step includes the steps of checking portions not satisfying requirements set for the specifications and the options, and calculating a penalty value whenever each of those portions is detected. The building sequence for all the processes is checked with respect to all of the specifications and options, and a total penalty value is calculated. The penalty value will be described below with reference to FIGS. 6 to 15.

Then, in step s35, the evaluation determining and storing unit 36 stores the penalty value in the memory 6 when the initial sequence is evaluated. In the second or subsequent evaluation, the evaluation determining and storing unit 36 compares the calculated penalty value with the stored value and stores the better penalty value in the memory 6.

Then, in step s40, the offline sequence preparing unit 38 prepares another pattern of the successive building sequence in an offline process by using a random number.

Then, in step s45, the lead-time developing unit 39 shifts a lead time to the preceding and succeeding processes for modification based on the offline sequence newly prepared by the offline sequence preparing unit 33, thereby preparing the successive building sequence for the entire process.

Then, in step s50, the sequence evaluating unit 35 evaluates the building sequence for the entire process and calculates an evaluation value (penalty value).

Then, in step s55, the evaluation determining and storing unit 36 compares the newly calculated evaluation value with the stored value.

Then, in step s60, the evaluation determining and storing unit 36 determines whether the evaluation value is improved. If the evaluation value is improved, the control flow proceeds to step 865, and if not improved, the flow proceeds to step s70.

If the evaluation value is improved, the evaluation determining and storing unit 36 adopts the newly prepared building sequence for all the sequence decision points and stores it in the memory 6 in step s65.

If the evaluation value is not improved, the evaluation determining and storing unit 36 discards the newly prepared building sequence for all the sequence decision points in step s70.

Further, the end-of-processing determining unit 37 checks in step s75 whether repetitive searches have been completed in a predetermined number of times. If repetitive searches have been completed in the predetermined number of times, the processing is brought to an end. If not, the control flow returns to step s40 to repeatedly execute the above-described processing.

The processing operation executed by the sequence preparing unit 33 in the building sequence planning system for the automobile production line according this embodiment will be described below with reference to FIGS. 4 to 20.

Figure 4:
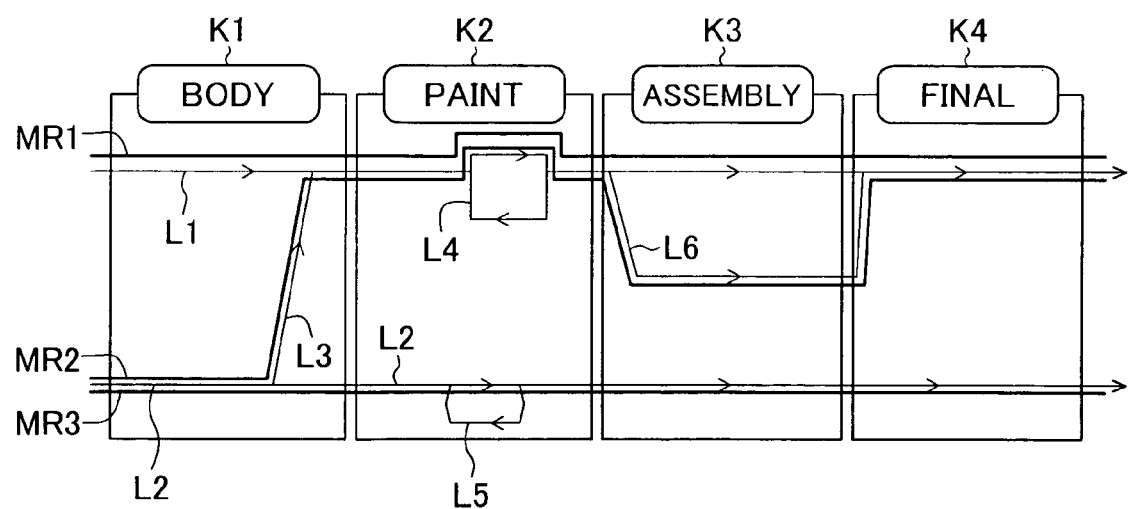
FIG. 4 is an illustration for explaining one example of basic processes and production lines in an automobile manufacturing factory for which a building sequence is to be prepared by the building sequence planning system for the automobile production line according to one embodiment of the present invention.

With reference to FIG. 4, a description is first made of one example of basic processes and production lines in an automobile manufacturing factory for which a building sequence is to be prepared by the building sequence planning system for the automobile production line according to this embodiment.

FIG. 4 is an illustration for explaining one example of basic processes and production lines in an automobile manufacturing factory for which a building sequence is to be prepared by the building sequence planning system for the automobile production line according to one embodiment of the present invention.

The entire process is mainly divided into, for example, four processes, i.e., a body process ("main" or "metal") K1, a painting process ("paint") K2, an assembly process ("trim") K3, and a final process ("final") K4. The manufacturing process advances, in order, from the body process, to the painting process, to the assembly process, and to the final process. The body process K1 is a process for welding and working a vehicle frame. The painting process K2 is a process for painting the body. The assembly process K3 is usually called a trimming process, and it is a process for assembling features and options.

In FIG. 4, arrow-headed thin lines denote production lines L. Each vehicle advances in the direction of arrows along the lines L resting on a carriage, while passing successive stages of work, so that the vehicle gradually approaches its completed form. Within each of the body process K1, the painting process K2, the assembly process K3, and the final process K4, various stations are interconnected by rails along the corresponding lines L, and the vehicles are moved at equal intervals and at a constant speed.

The lines L include, by way of example, main lines L1, L2. A line L3 laid in the body process K1 is separated from the line L2 and joins with the line L1. A loop-like line L4 laid in the painting process K2 is separated from a part of the line L1 and then joins with the line L1 again after moving the vehicle in the direction opposite to the line L1. A line L5 laid in the painting process K2 is similarly separated from a part of the line L2 and then joins with the line L2 again after moving the vehicle in the direction opposite to the line L2. These lines L4, L5 are used to pass the vehicle through a painting booth twice and to perform painting twice, for example, in the case of panting the vehicle in two-tone colors. A line L6 laid in the assembly process K3 is separated from the line L1 and then joins with the line L1 again in the final process K4.

A thick line represents a manufacturing route MR for each vehicle type. There are, by way of example, a sedan type manufacturing route MR1, a mini-van and wagon type manufacturing route MR2, and an RV type manufacturing route MR3. In the body process K1, mini-van and wagon type vehicles and RV type vehicles are manufactured along the line L2. Because mini-van and wagon type vehicles have frames closer to those of RV type vehicles than those of sedan type vehicles, the mini-van and wagon type vehicles and the RV type vehicles are manufactured along the same line L2. On the other hand, looking at painting work, because painting of the mini-van and wagon type vehicles is closer to that of the sedan type vehicles from the viewpoint of the vehicle shape, e.g., the vehicle height, those two types of vehicles are painted along the line L1. In order to move the mini-van and wagon type vehicles from the line L2 to L1, the line L3 is provided for separation and joining between the lines L2 and L1.

Because the specifications and the options set on respective vehicles differ among the sedan type, the mini-van and wagon type, and the RV type, the independent line L6 is provided in the assembly process K3 in addition to the lines L1 and L2.

Though not shown, a buffer allowing one or more vehicles to stand therein is often provided between an adjacent pair of the four main processes. In some equipment, a sequence of vehicles can be exchanged in the buffer, but the following description is made presuming that first-in first-out equipment is used.

One example of the building sequence decision points used in the building sequence planning system for the automobile production line according to this embodiment will be next described with reference to FIG. 5.

Figure 5:
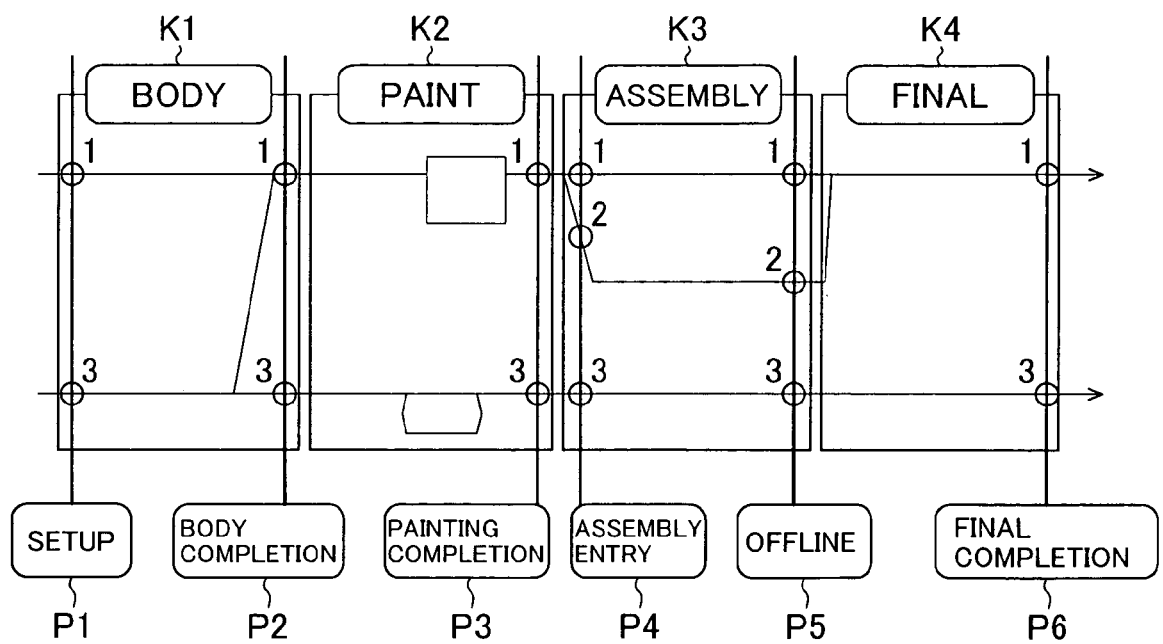
FIG. 5 is an illustration for explaining one example of building sequence decision points used in the building sequence planning system for the automobile production line according to one embodiment of the present invention.

FIG. 5 is an illustration for explaining one example of building sequence decision points used in the building sequence planning system for the automobile production line according to one embodiment of the present invention. Note that the same symbols as those in FIG. 4 denote the same components.

FIG. 5 shows checkpoints P in manufacturing processes obtained by breaking down the main processes shown in FIG. 4. While there are usually 15 to 20 checkpoints in the automobile manufacturing industry, the description is made in connection with 6 typical points for simplicity of explanation. More specifically, as shown in FIG. 5, a setup point P1 and a body completion point P2 are set respectively at an inlet and an outlet of the body process K1. Also, a painting completion point P3 is set at an outlet of the painting process K2. An assembly entry point P4 and an offline point P5 are set respectively at an inlet and an outlet of the assembly process K3. Further, a final completion point P6 is set at an outlet of the final process K4.

By checking at those 6 points, the manufacturing route of the vehicle to be manufactured can be represented using numbers shown in FIG. 5. For example, the manufacturing route MR2 for the mini-van type, shown in FIG. 4, is represented by "setup 3"-"body completion 1"-"painting 1"-"assembly entry 1" "offline 2"-"final completion 1". These numbers are each called a line section and expressed by "311121".

By deciding the successive building sequence at each point designated by the line section, a work schedule for the entire factory is obtained. The term "building sequence at each point" means a sequence at which vehicles pass the relevant building sequence decision point. Because the vehicles are subjected to line work and cannot pass the relevant point at the same time, the sequence at which the vehicles pass at certain time differences is called here the building sequence or the successive building sequence or simply the sequence.

One example of restriction conditions in preparing the building sequence, which are set for specifications and options and are used in the building sequence planning system for the automobile production line according to this embodiment, will be described.

FIG. 6 is an illustration for explaining one example of restriction conditions in preparing the building sequence, which are set for specifications and options and are used in the building sequence planning system for the automobile production line according to one embodiment of the present invention.

The term "specifications and options" is used herein as follows. When a user purchases an automobile, the user requests the automobile to have a "navigation unit" and to be a "4WD vehicle", for example. These user's requests, such as "navigation unit" and "4WD vehicle", are all included in the specifications and the options. In addition, when the user requests that the vehicle type is sedan, the color is black, and the displacement is 2000 cc, these requests are all specifications looking from the maker side and are generally called "spec". Stated another way, each vehicle is ordered in accordance with the basic product series and the vehicle type, and other specifications are all provided in add-on style.

In this embodiment, for the specifications and the options, five kinds of conditions shown in FIGS. 6(A) to 6(E) (i.e., A: occupancy rate leveling, B: minimum interval vehicle number, C: maximum succeeding vehicle number, D: lot condition, and E: assignment range designation) can be added in preparing the successive building sequence.

The first condition is leveling based on an occupancy rate, as shown in FIG. 6(A). Assuming a vehicle having specifications A to be a vehicle A, this condition means that when the vehicle A occupies 30% of all vehicles ordered to be assembled, the vehicles A are desirably arranged in an evenly distributed way with respect to remaining 70% of vehicles other than A. For example, when there are 20 assembled vehicles and the number of the vehicles A among them is six as shown in FIG. 6(A), the vehicles A are assigned such that they are distributed as the first, fourth, eighth, eleventh, fourteenth and seventeenth vehicles.

The second condition is the minimum interval vehicle number in FIG. 6(B), and this condition means that at least a designated number of vehicles other than A are desirably sandwiched between two vehicles A. For example, when the minimum interval vehicle number is one as shown in FIG. 6(B), the vehicles A are assigned as the first, third, seventh, ninth, fourteenth and twentieth ones so that one or more vehicles other than A are sandwiched between two vehicles A.

The third condition is the maximum succeeding vehicle number shown in FIG. 6(C), and this condition means that the vehicles A may be successively arranged, but the number of succeeding vehicles is desirably held not larger than a designated value at maximum. For example, when the maximum succeeding vehicle number is three as shown in FIG. 6(C), the vehicles A are assigned as the second, third, eighth, tenth, eleventh and twelfth ones, so that the vehicles A are successively arranged three at maximum.

The fourth condition is a lot condition shown in FIG. 6(D), and this condition means that the vehicles A are desirably assigned as a lot in which they are successively arranged in what number at minimum and at maximum. For example, assuming that there are 24 assembled vehicles and the number of the vehicles A among them is ten and that the lot condition is five at maximum and two at minimum, as shown in FIG. 6(D), the vehicles A are assigned as the first, second, third, ninth, tenth, eleventh, twelfth, thirteenth, twenty-first and twenty-second ones so that five of the vehicles A are successively arranged at maximum and two of the vehicles are successively arranged at minimum.

The fifth condition is the assignment range designation shown in FIG. 6(E), and this condition means in which range of all orders the vehicles A should be loaded. This represents designation inherently resulting from a condition such as a unit load per transport track. Therefore, the assignment range is designated in terms of time zone from what time to what time, or in terms of rate indicating that the vehicles A are loaded for production from what % to what % of all the orders counting from the head. For example, assuming that there are 30 assembled vehicles (offline vehicles) and the number of the vehicles A among them is seven and that the assignment range designation is 0 to 50%, as shown in FIG. 6(E), the vehicles A are assigned as the first, fourth, sixth, ninth, eleventh, thirteenth and fifteenth ones so that the vehicles A are arranged in the range of 0 to 50%, i.e., in the range of first to fifteenth vehicles.

The reason why the above conditions are each expressed using a word "desirably" instead of the absolute imperative form is that the order building sequence always satisfying all the conditions may not exist, depending on order patterns. Accordingly, the word "desirably" is used as an expression indicating "conformity with the conditions as far as possible". In other words, those conditions are each not held as a condition unless any penalty is set when the conditions are not met. In this embodiment, therefore, "penalties" are laid when the conditions are not met, and the penalty is calculated for each condition. A method of calculating the penalty will be described later with reference to FIGS. 7 to 9.

As the restriction conditions in preparing the successive building sequence, any other suitable condition than the above-described ones can also be set additionally. Further, as the restriction conditions in preparing the successive building sequence which are set with respect to the specifications and the options, essential ones among the five kinds of conditions shown in FIGS. 6(A) to 6(E) are four, i.e., A: occupancy rate leveling, B: minimum interval vehicle number, C: maximum succeeding vehicle number, and D: lot condition. The condition of E: assignment range designation, can be set as required.

A method of calculating the penalty for the occupancy rate leveling condition among the restriction conditions used in the building sequence planning system for the automobile production line according to this embodiment will be next described with reference to FIG. 7.

Figure 7:
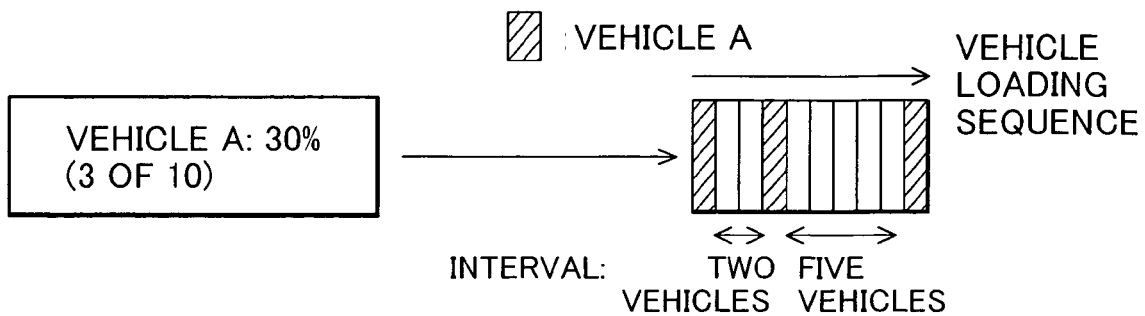
FIG. 7 is an illustration for explaining a method of calculating a penalty for an occupancy rate leveling condition among the restriction conditions used in the building sequence planning system for the automobile production line according to one embodiment of the present invention.

FIG. 7 is an illustration for explaining the method of calculating the penalty for the occupancy rate leveling condition among the restriction conditions used in the building sequence planning system for the automobile production line according to one embodiment of the present invention.

The leveling condition based on the occupancy rate is a condition that, as shown in FIG. 6(A), when the vehicle A occupies 30% of all vehicles ordered to be assembled, the vehicles A are desirably arranged in an evenly distributed way with respect to remaining 70% of vehicles other than A. For example, as shown in FIG. 7, when there are 10 assembled vehicles and the number of the vehicles A among them is three, the vehicles A are assigned such that they are distributed as the first, fourth and tenth vehicles. The penalty calculated in such a case is described here.

Among a total number of vehicles, how many vehicles other than A can be placed between two vehicles A (i.e., expected interval vehicle number) is determined. The expected interval vehicle number can be determined based on a formula of ((total number of vehicles−number of vehicles A)/number of vehicles A). For example, when three vehicles A are included in a total of ten vehicles, the expected interval vehicle number is determined as 2.3 (=(10−3)/3).

In the case of an array sequence in which the three vehicles A are assigned as the first, fourth and tenth ones, as shown in FIG. 7, the interval vehicle number is 2 and 5. These values differ from the expected interval vehicle number 2.3, and hence penalties are applied to both the intervals.

The penalty value is calculated from a formula of (penalty weight)×(square of absolute value of difference from the expected interval vehicle number). In the example of FIG. 7, assuming the weight to be "−5", the penalty in the case of the two-vehicle interval is calculated as −0.45 (=(−5)×(0.3)×(0.3)), and the penalty in the case of the five-vehicle interval is calculated as −36.45 (=(−5)×(2.3)×(2.3)). Thus, negative impression is quantified in terms of penalty. As the penalty increases, a negative value increases. This means that a smaller negative value (closer to 0) represents a better case. The penalty in the case of the two-vehicle interval is −0.45 point, and the penalty in the case of the five-vehicle interval is −36.45 points. In other words, the penalty is generated in any of the cases that the vehicles A are too close to each other and that they are too far away from each other.

A method of calculating the penalty for the minimum interval vehicle number condition among the restriction conditions used in the building sequence planning system for the automobile production line according to this embodiment will be next described with reference to FIG. 8.

Figure 8:
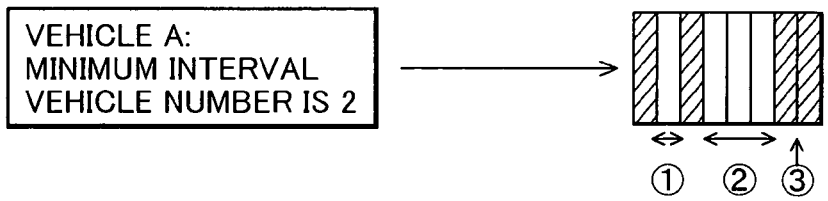
FIG. 8 is an illustration for explaining a method of calculating a penalty for a minimum interval vehicle number condition among the restriction conditions used in the building sequence planning system for the automobile production line according to one embodiment of the present invention.

FIG. 8 is an illustration for explaining the method of calculating the penalty for the minimum interval vehicle number condition among the restriction conditions used in the building sequence planning system for the automobile production line according to one embodiment of the present invention.

The penalty value is calculated from a formula of (penalty weight)×(square of absolute value of difference from the designated minimum interval vehicle number). Assuming, for example, that the minimum interval vehicle number is two and four vehicles A are assigned in an array sequence of 8 vehicles as the first, third, seventh and eighth ones, as shown in FIG. 8, a penalty is applied to the interval between the first and third vehicles because the number of vehicles in that interval is one, but no penalty is applied to the interval between the third and seventh vehicles because the number of vehicles in that interval is three. Further, a penalty is applied to the interval between the seventh and eighth vehicles because the number of vehicles in that interval is zero.

In the example of FIG. 8, assuming the weight to be "−5", the penalty value in the case of the one-vehicle interval is calculated as −5 (=(−5)×(1)×(1)), and the penalty in the case of the zero-vehicle interval is calculated as −20 (=(−5)×(2)×(2)).

A method of calculating the penalty for the maximum succeeding vehicle number condition among the restriction conditions used in the building sequence planning system for the automobile production line according to this embodiment will be next described with reference to FIG. 9.

Figure 9:
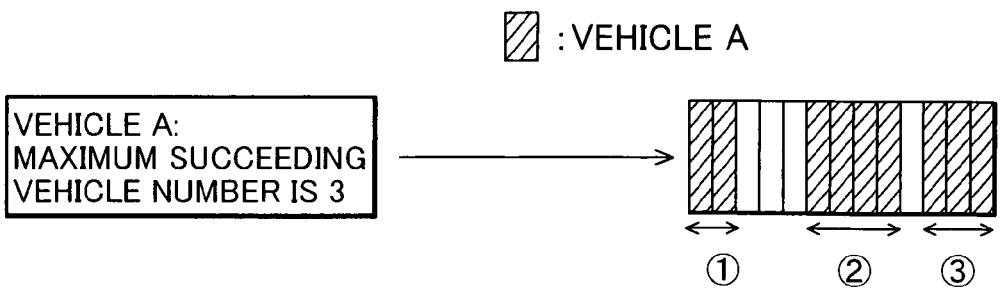
FIG. 9 is an illustration for explaining a method of calculating a penalty for a maximum succeeding vehicle number condition among the restriction conditions used in the building sequence planning system for the automobile production line according to one embodiment of the present invention.

FIG. 9 is an illustration for explaining the method of calculating the penalty for the maximum succeeding vehicle number condition among the restriction conditions used in the building sequence planning system for the automobile production line according to one embodiment of the present invention.

The penalty value is calculated from a formula of (penalty weight)×(square of absolute value of difference from the designated maximum succeeding vehicle number). Assuming, for example, that the maximum succeeding vehicle number is three and nine vehicles A are assigned in an array sequence of 13 vehicles as the first, second, sixth, seventh, eighth, ninth, eleventh, twelfth and thirteenth ones, as shown in FIG. 9, no penalty is applied to the range of the first to second vehicles because the number of succeeding vehicles in that range is two, but a penalty is applied to the range of the sixth to ninth vehicles because the number of succeeding vehicles in that range is four. Further, no penalty is applied to the range of the eleventh to thirteenth vehicles because the number of succeeding vehicles in that range is three.

In the example of FIG. 9, assuming the weight to be "−5", the penalty value in the case of the four succeeding vehicles is calculated as −5 (=(−5)×(1)×(1)).

Additionally, the penalty value can be likewise calculated for the lot condition shown in FIG. 6(D) and the assignment range designation shown in FIG. 6(E).

The building sequence preparing process executed in steps s20 and s40 of FIG. 3 will be next described with reference to FIGS. 10 and 11.

FIGS. 10 and 11 are illustrations for explaining the building sequence preparing process executed in the building sequence planning system for the automobile production line according to one embodiment of the present invention.

In step s20 of FIG. 3, the initial offline sequence preparing unit 33 prepares the initial building sequence at the offline point where the assembly process is completed.

Figures 10A, 10B:
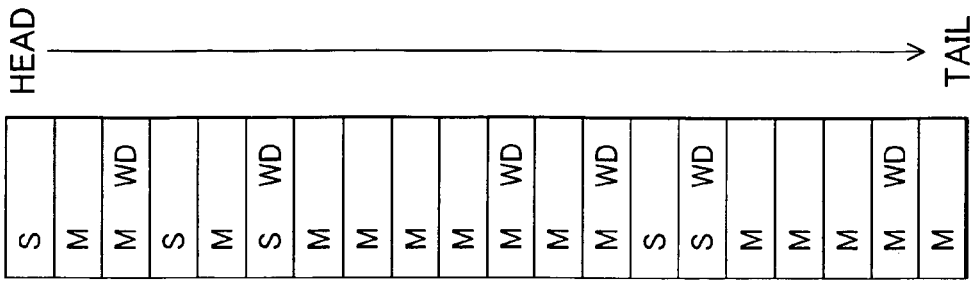
FIG. 10 is an illustration for explaining a building sequence preparing process executed in the building sequence planning system for the automobile production line according to one embodiment of the present invention.

Assuming, for example, that there are 20 vehicles having three kinds of specifications (specs), i.e., sedan (S), mini-van (M) and 4WD (WD), and two kinds of specifications are set for each vehicle, as shown in FIG. 10(A). When the initial array sequence is prepared using a random number for the 20 vehicles, i.e., 3 sedan types, 2 (sedan+4WD) types, 11 mini-van types, and 4 (mini-van+4WD) types, it is obtained, by way of example, as shown in FIG. 10(B). In other words, the 20 vehicles are arranged in an array sequence of, from the start, sedan, mini-van, mini-van+4WD, sedan, mini-van, sedan+4WD, and so on.

In step s40, the offline sequence preparing unit 38 prepares another pattern of the successive building sequence in the offline process by using a random number. In a mutually coupled neural network or a genetic algorithm, a uniform random number corresponding to the number of orders (i.e., a random number causing the numbers 1 to 20 to appear at the same probability in this embodiment) is generated twice. If two random number values differ from each other, a new array sequence is produced by exchanging the vehicles at positions indicated by those random numbers. For example, the array sequence shown in FIG. 11(A) (which is the same as that shown in FIG. 10(B)) is changed based on two random numbers into a new array sequence shown in FIG. 11(B).

The evaluation value calculating process in steps s30 and s50 of FIG. 3 will be next described with reference to FIGS. 12 to 15.

FIGS. 12 to 15 are tables for explaining the evaluation value calculating process executed in the building sequence planning system for the automobile production line according to one embodiment of the present invention.

FIG. 12 shows a table for evaluating the restriction conditions with respect to the specifications and the occupancy rate. The restriction condition with respect to the specification "sedan" is that the minimum interval vehicle number is one. Also, the restriction condition with respect to the specification "4WD" is that the minimum interval vehicle number is two. The restriction condition with respect to the specification "mini-van" is that the maximum continuous vehicle number is three.

Also, the leveling condition based on the occupancy rate is set for all the specifications. In the example shown in FIG. 10(A), because the number of sedans is five among all twenty vehicles, the expected interval vehicle number for the sedan type is calculated as 3 (=(20−5)/5), as described above with reference to FIG. 7. The expected interval vehicle number for the 4WD type is 2.3 (=(20−6)/6). The expected interval vehicle number for the mini-van type is 0.2 (=(20−15)/15).

The penalty weight applied to the restriction conditions with respect to the specifications and the occupancy rate is assumed to be −5.

In step s30 of FIG. 3, the sequence evaluating unit 35 evaluates the building sequence for all the processes, which has been prepared by the initial lead-time developing unit 34. The evaluation in this step includes the steps of checking portions not satisfying requirements set for the specifications and the options, and calculating a penalty value whenever each of those portions is detected. The building sequence for all the processes is checked with respect to all of the specifications and the options, and a total penalty value is calculated.

FIG. 13 shows, by way of example, a result of evaluating the initial building sequence, shown in FIG. 10(B), by using the evaluation table, shown in FIG. 12, for the restriction conditions with respect to the specifications and the occupancy rate.

First, the penalty value with respect to the leveling of the occupancy rate is described. In the case of the specification "sedan", the expected interval vehicle number is 3. Because the sedan is assigned as the first vehicle and then the fourth vehicle, the number of the vehicles in the interval between them is 2. Therefore, the penalty value is calculated as $-5$ ($=(-5) \times (3-2) \times (3-2)$) based on the calculation method described above with reference to FIG. 7. Because the sedan subsequent to the fourth vehicle is assigned as the sixth vehicle, the interval between them includes one vehicle, and therefore the penalty value is calculated as $-20$ ($=(-5) \times (3-1) \times (3-1)$). By similarly determining the penalties with respect to the occupancy rate for all the sedans, respective values are obtained as "0", "$-5$", "$-20$", "$-80$" and "$-45$". Thus, a total penalty value is "$-150$".

In the case of the specification "4WD", the expected interval vehicle number is 2.3. Because the "4WD" is assigned as the third vehicle and then the sixth vehicle, the number of the vehicles in the interval between them is 2. Therefore, the penalty value is calculated as $-0.45$ ($=(-5) \times (2.3-2) \times (2.3-2)$). Because the "4WD" subsequent to the sixth vehicle is assigned as the eleventh vehicle, the interval between them includes four vehicles, and therefore the penalty value is calculated as $-14.45$ ($=(-5) \times (2.3-4) \times (2.3-4)$). By similarly determining the penalties with respect to the occupancy rate for all the "4WD" vehicles, respective values are obtained as "0", "$-0.45$", "$-14.45$", "$-8.45$", "$-8.45$" and "$-2.45$". Thus, a total penalty value is "$-34.25$". Likewise, for the specification "mini-van", the penalty value with respect to the occupancy rate is calculated and a total penalty value of "$-17.6$" is obtained.

Next, the penalty value with respect to the restriction conditions is described. As shown in FIG. 12, the specification "sedan" is subjected to the restriction condition that the minimum interval vehicle number is "1". Because the sedan is assigned as the first, fourth, sixth and fourteenth vehicle, the interval between two sedans includes two, one and seven vehicles, respectively, and therefore no penalty is applied. However, because the sedan subsequent to the fourteenth vehicle is assigned as the fifteenth vehicle, the interval between them includes no (0) vehicle, and therefore the penalty value is calculated as $-5$ ($=(-5) \times (1-0) \times (1-0)$) based on the calculation method described above with reference to FIG. 8. By similarly determining the penalties with respect to the restriction conditions for all the sedans, respective values are obtained as "0", "0" and "$-5$". Thus, a total penalty value is "$-5$".

Also, as shown in FIG. 12, the specification "4WD" is subjected to the restriction condition that the minimum interval vehicle number is "2". Because the "4WD" specification is assigned to the third, sixth and eleventh vehicles, the interval between two "4WD's" includes two and four vehicles, respectively, and therefore no penalty is applied. However, because the "4WD" subsequent to the eleventh vehicle is assigned as the thirteenth vehicle, the interval between them includes 1 vehicle, and therefore the penalty value is calculated as $-5$ ($=(-5) \times (2-1) \times (2-1)$). By similarly determining the penalties with respect to the restriction conditions for all the "4WD's", respective values are obtained as "0", "0", "0", "$-5$", "$-5$" and "0". Thus, a total penalty value is "$-10$". Likewise, for the specification "mini-van", the penalty value with respect to the maximum succeeding vehicle number is calculated and a total penalty value of "$-100$" is obtained. Additionally, in the case of the specification "mini-van", seven mini-vans continue from the seventh to thirteenth vehicle. For the thirteenth mini-van, i.e., the last one of those seven successive mini-vans, the penalty value is calculated as $-80$ ($=(-5) \times (7-3) \times (7-3)$) based on the calculation method described above with reference to FIG. 9.

Accordingly, a grand total of the penalty values for the array sequence shown in FIG. 13 is "$-316.85$".

Next, FIG. 14 shows, by way of example, a result of evaluating the building sequence after the exchange, shown in FIG. 11(B), by using the evaluation table, shown in FIG. 12, for the restriction conditions with respect to the specifications and the occupancy rate.

After the offline sequence preparing unit 38 prepares, in step s40 of FIG. 3, another pattern of the successive building sequence in the offline process by using a random number, the sequence evaluating unit 35 evaluates the building sequence for all the processes and calculates the evaluation value (penalty value) in step s50. A calculation method is the same as that described above with reference to FIG. 13.

When the ninth and eleventh vehicles are exchanged as described above with reference to FIGS. 11(A) and 11(B), the penalties for sedans and mini-vans with respect to the leveling based on the occupancy rate are not changed, i.e., "$-150$" and "$-17.6$", respectively. However, the penalty for "4WD" with respect to the leveling based on the occupancy rate is reduced from "$-34.25$" to "$-14.25$". Also, the penalties for sedans with respect to the minimum interval vehicle number and for mini-vans with respect to the maximum interval vehicle number are not changed, i.e., "$-5$" and "$-100$", respectively. However, the penalty for "4WD" with respect to the minimum interval vehicle number is reduced from "$-10$" to "$-5$".

Accordingly, a grand total of the penalty values for the array sequence shown in FIG. 14 is "$-291.85$" which shows a better result than the initial array sequence.

Next, FIG. 15 shows an array sequence and an evaluation result at which the total penalty value is minimized. The search including sequence exchange is performed in the designated number of times as described above in connection with step s75 of FIG. 3. Then, if the evaluation value (penalty value) is improved from the previous one, the newly prepared building sequence for all the sequence decision points is adopted and stored in step s65. The building sequence thus decided is shown in FIG. 15.

By building the vehicles in a sequence of "sedan+4WD", "mini-van", "mini-van", "sedan+4WD" and "mini-van" as shown in FIG. 15, the total penalty value for the specification "sedan" with respect to the occupancy rate is "$-15$", the total penalty value for the specification "4WD" with respect to the occupancy rate is "$-7.8$", and the total penalty value for the specification "mini-van" with respect to the occupancy rate is "$-17.6$". Further, the total penalty values for the specifications "sedan", "4WD" and "mini-van" with respect to the restriction conditions are all "0". Therefore, a grand total of the penalty values is reduced to "$-40.4$".

Additionally, by employing a mutually coupled neural network instead of a random search, a convergence speed to the optimum array sequence can be increased. The use of a genetic algorithm is able to further increase the convergence speed. It is also possible to control the final sequence as intended by a designer depending on the evaluation formula and the weight used in the calculation.

The lead-time shifting process executed in steps s25 and s45 of FIG. 3 will be described below with reference to FIGS. 16 to 20.

FIGS. 16 to 20 are illustrations for explaining the lead-time shifting process executed in the building sequence planning system for the automobile production line according to one embodiment of the present invention.

Figure 16A:
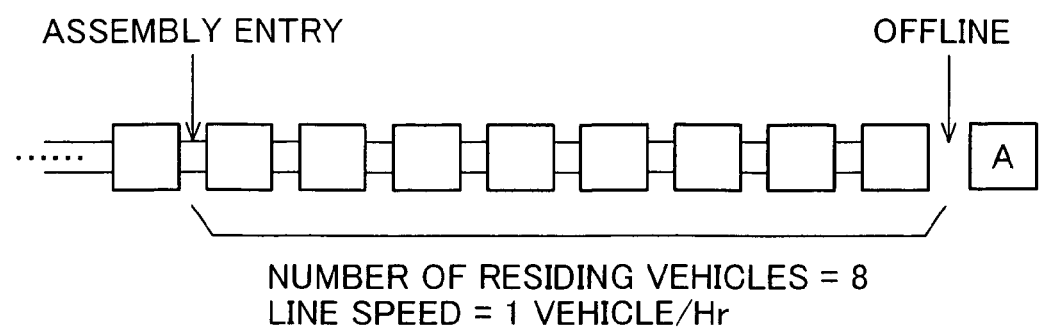
FIG. 16 is an illustration for explaining a lead-time shifting process executed in the building sequence planning system for the automobile production line according to one embodiment of the present invention.
Figure 16B:
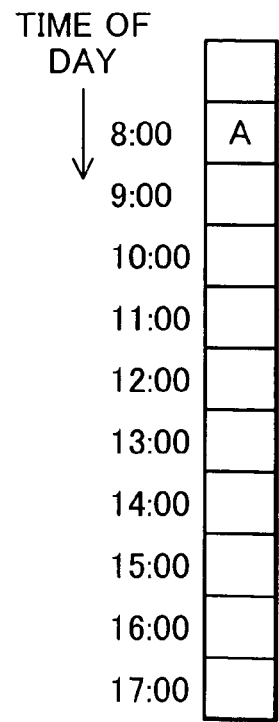
Figure 16C:
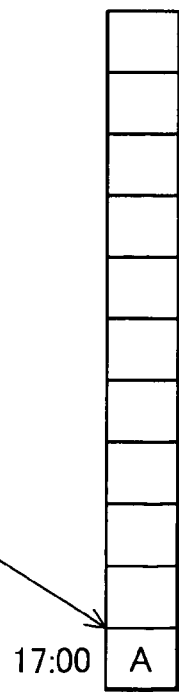

The basic concept of lead-time shifting will be first described with reference to FIG. 16. FIG. 16 illustrates the lead-time shifting in connection with, by way of example, the assembly process K3 shown in FIG. 5. In FIGS. 16(A), 16(B) and 16(C), each square box represents one vehicle.

FIG. 16(A) shows a state in which eight vehicles reside between the assembly entry process (point P4 in FIG. 5) and the offline process (point P5 in FIG. 5). When the work time required for one vehicle is 1 hour (i.e., in the case of 1 vehicle/Hr), it takes 8 hours to reach the offline process from the assembly entry process.

FIG. 16(B) shows the building sequence in the assembly entry process, and FIG. 16(C) shows the building sequence in the offline process. When the relevant vehicle should be obtained at 17:00 in the offline process as shown in FIG. 16(C), it is required to loaded such that the assembly entry process is completed 8 hours before, namely at 8:00, based on the line speed and the number of residing vehicles in the assembly process, i.e., 8 vehicles÷1 vehicle/Hr. In such a way, the array sequence can be transferred to the preceding process in consideration of the number of residing vehicles and the treatment speed.

Figure 17A:
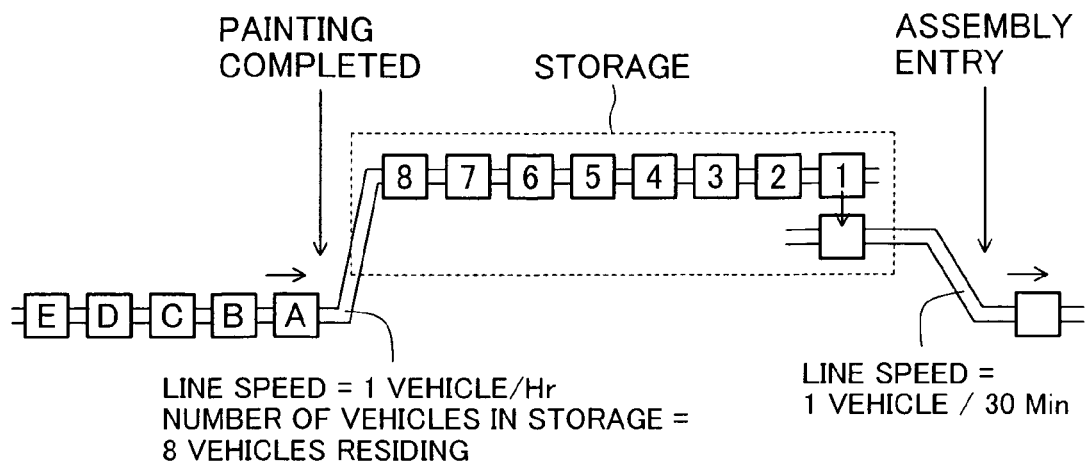
FIG. 17 is an illustration for explaining a lead-time shifting process executed in the building sequence planning system for the automobile production line according to one embodiment of the present invention.
Figures 17B, 17C, 17D:
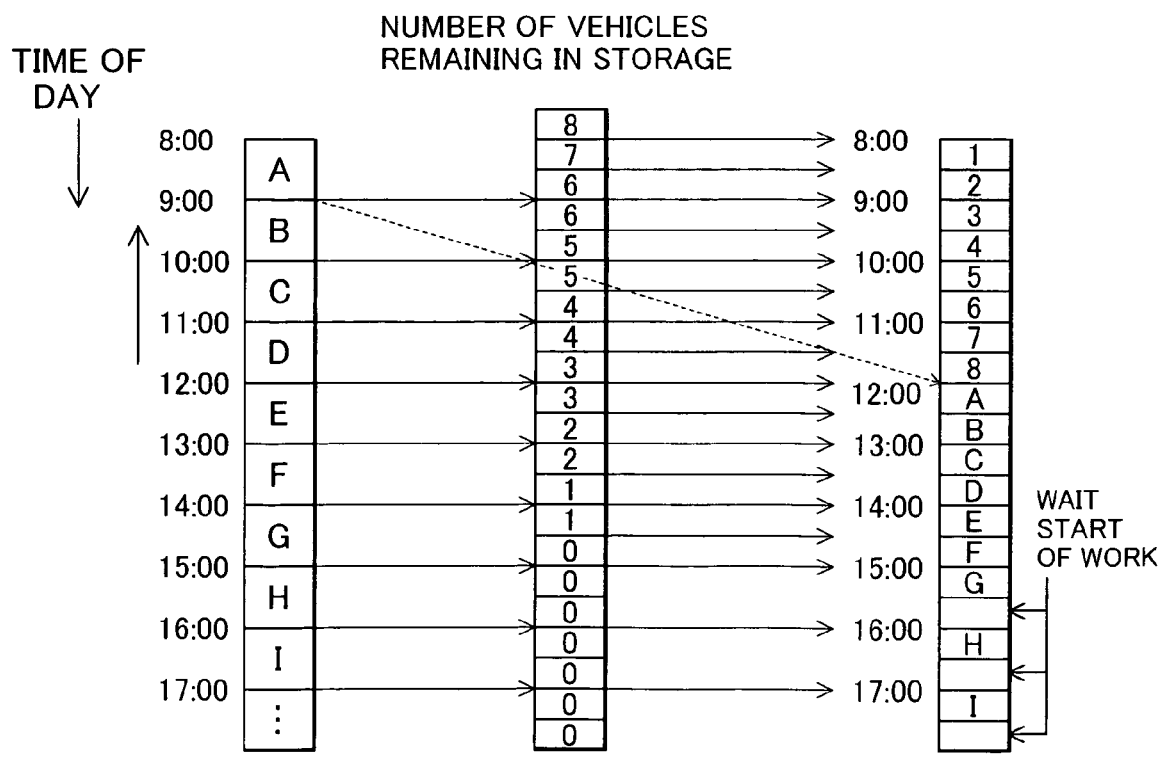

The concept of lead-time shifting in the presence of a storage will be next described with reference to FIG. 17. FIG. 17 illustrates the lead-time shifting in connection with, by way of example, the case in which the storage is provided between the painting process K2 and the assembly process K3 shown in FIG. 5. In FIGS. 17(A), 17(B), 17(C) and 17(D), each square box represents one vehicle.

If there is a difference in capability between the processes, the vehicles in the process having a higher capability are brought into a standby state and the line must be stopped unless a countermeasure for absorbing such a difference in capability is devised. For that reason, a buffer, generally called a storage, is provided.

For example, as shown in FIG. 17(A), assuming that the line speed in the painting process K2 is 1 vehicle/Hr and the line speed in the assembly process K3 is 1 vehicle/30 Min, the buffer, i.e., the so-called storage, capable of accommodating 8 vehicles, is provided between the painting completion point P3 in the painting process K2 and the assembly entry point P4 in the assembly process K3 shown in FIG. 5. The painting process, having a lower capability, continues operation to send the vehicles into the storage in the time zone during which the assembly process is at rest, thereby maintaining a speed balance between those two processes. In practice, the working time of the painting process having a lower capability is increased so that the vehicles are accumulated in the storage. Stated another way, while the vehicles accumulated in the storage are sent for assembly work to the assembly process having a higher capability, the painting work is continued such that several vehicles always remain in the storage. As a result of such a scheme, the line can be avoided from being stopped on the assembly side having a higher capability.

FIG. 17(B) shows the building sequence at the painting completion point, FIG. 17(C) shows the number of vehicles remaining in the storage, and FIG. 17(D) shows the building sequence in the assembly entry process.

The lead-time shifting in the storage can be performed based on the number of vehicles accumulated in the storage. Assuming, for example, that the vehicle A shown in FIG. 17(D) is to be loaded into the assembly entry point at 12:00, if the number of vehicles remaining in the storage at that time is "3", the vehicle A is required to be loaded into the painting completion point in the painting process at 8:00 by going back for a time corresponding to three vehicles.

Thus, in the case including the storage, the lead-time shifting can be performed based on the balance calculation of the number of vehicles in the storage, which is made taking into account the number of vehicles accumulated in the storage shown in FIG. 17 in combination with the number of residing vehicles shown in FIG. 16. The term "balance calculation" used herein means an operation of calculating the number of vehicles coming into and going out from the storage in respective temporal sections at which the vehicles come in from the preceding process and go out to the succeeding process, thereby determining the number of vehicles remaining in the storage.

The concept of the lead-time shifting illustrated in FIG. 17 will be described below in connection the actual operation with reference to FIG. 18.

On the painting completion side, as shown in FIG. 18(A), the production is continuously performed while periods of rest time (e.g., 3:00 to 4:00 and 12:00 to 13:00) are set during the continuous work. In the process on the assembly entry side, as shown in FIG. 18(C), the production is performed while taking a rest in a part of shifts (e.g., 23:00 to 8:00 and 12:00 to 13:00) so that a line capability is held in sync with the painting completion side. On the assembly entry side, one vehicle is assembled per 30 minutes at a capability twice that on the painting completion side. The painting completion side continues the production at a capability of one vehicle per hour. FIG. 18(B) shows changes in the number of vehicles remaining in the storage in the above-described case.

FIG. 18 shows an example in which a balance is taken between two processes. Looking at a vehicle Z on the assembly entry side, it is a vehicle for which the painting is completed at 23:00. To assign the vehicle Z in the assembly entry process at 8:00, in this embodiment, balance tracing is made on coming-in and going-out of vehicles to and from the storage, shown in FIG. 18(B), in respective temporal sections at which vehicles come into and go out from the storage. In the section of the time (8:00) at which the vehicle Z is taken into the assembly entry point, the number of vehicles remaining in the storage is 8. Accordingly, the number 8 means that the vehicle Z is to be placed in the position having skipped back 8 vehicle production frames in the painting completion process (namely going back a corresponding period of time). In the painting completion process, therefore, the vehicle Z is assigned in the production frame starting from 22:00 by skipping the production frames for 8 vehicles, i.e., vehicles h, g, f, e, d, c, b and a, from the time 8:00.

Looking at the above description based on the number of production frames (also called tacts), it is understood that a period of non-operation time can be considered in a very easy manner. In other words, because the assignment can be made just by counting the number of production frames, it is no longer needed to assign no production frame in the period of non-operation time.

Further, the illustrated example shows that, when there is a difference in capability between the preceding and succeeding processes, any difference in capability or any difference in operation time can be absorbed by controlling the number of vehicles accumulated in the storage.

Lead-time modification in the lead-time shifting process executed in steps s25 and s45 of FIG. 3 will be described below with reference to FIGS. 19 and 20.

FIG. 19(A) shows an example of two-tone color painting. A vehicle Y requiring the two-tone color painting has to pass a painting booth twice. In other words, the vehicle Y is subjected to a first loop of painting in the painting booth after the painting entry process, and then it enters again the painting booth via a bypass line for a second loop of painting.

Assuming, as shown in FIG. 19(B), that vehicles are arranged in a sequence of X, Y, 1, 2, 3, 4, 5, 6 and 7 in the first loop of painting, because the vehicle Y enters the second loop as shown in FIG. 19(C), vehicles are arranged in a sequence of X, Y, 1, 2, 3, 4, 5, 6, Y and 7 at that time. As shown in FIG. 19(D), therefore, the sequence at the painting completion point is given as X, "Empty", Y, 1, 2, 3, 4, 5, 6, Y and 7. Thus, the vehicles cannot be obtained in the sequence of X, Y, 1, 2, 3, . . . in the painting completion process.

In the case desiring the vehicles to be obtained in the sequence of X, Y, 1, 2, 3, . . . in the painting completion process, the sequence can be adaptively exchanged if a time required for the vehicle to move along a route for the second loop of painting can be confirmed. In the example shown in FIG. 19(A), on an assumption that the time required for moving along the bypass line is two hours, the above-mentioned problem can be overcome by building the relevant vehicle into the painting entry process at a 2-hour earlier timing. Modifying the sequence based on the time required for moving along the bypass line, etc. in such a way is herein called lead-time modification. The lead-time modification can be performed in terms of time or number of vehicles.

The concept of the lead-time modification, illustrated in FIG. 19, will be described below in connection with a more practical painting line with reference to FIG. 20.

Figure 20A:
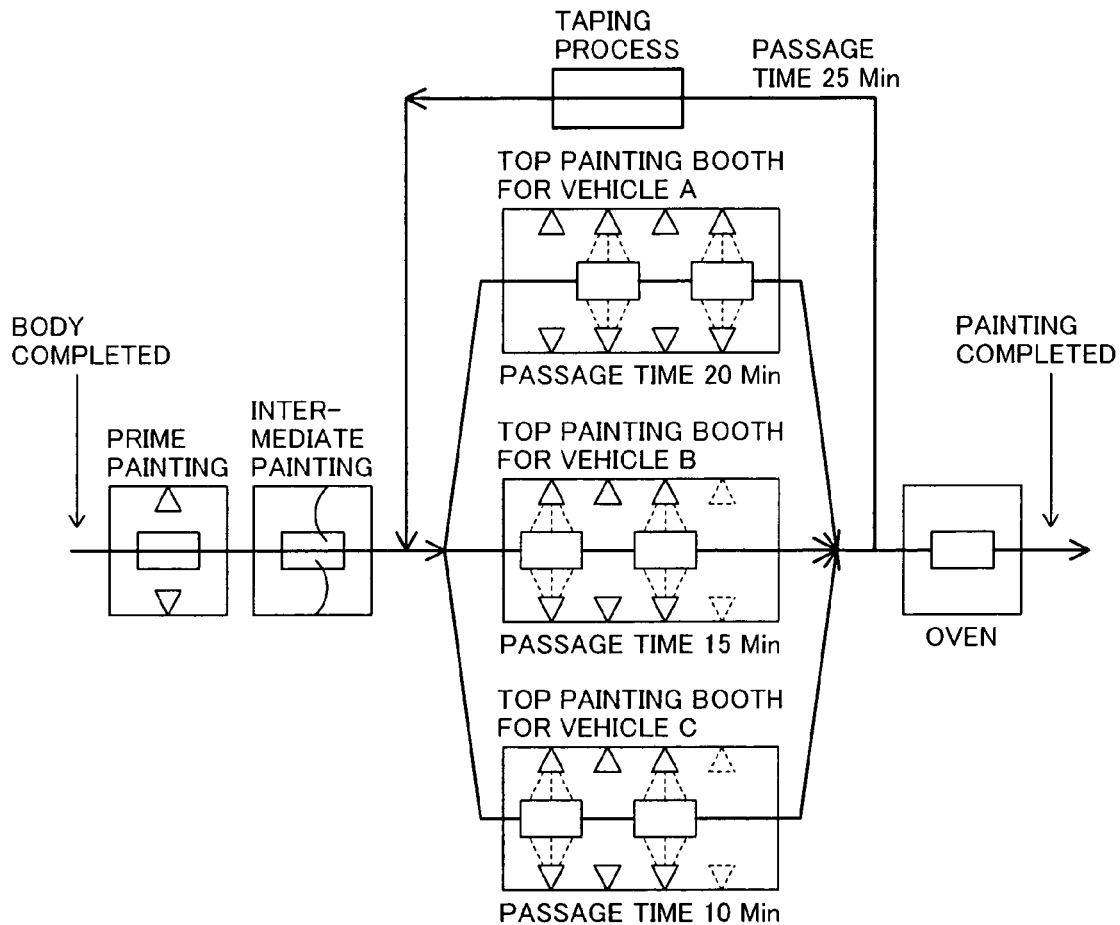
FIG. 20 is an illustration for explaining a lead-time shifting process executed in the building sequence planning system for the automobile production line according to one embodiment of the present invention.

As shown in FIG. 20(A), the painting process in the automobile manufacturing industry comprises the steps of prime painting (generally electrodeposition coating), intermediate painting, top painting, and oven (baking). The top painting step is made up of a plurality of painting booths (i.e., a top painting booth for a paint color A, a top painting booth for a paint color B, and a top painting booth for a paint color C). Note that the paint color in the painting booth is not fixed, but it can be changed or replaced.

Generally, because a white color requires a larger number of times of paintings (i.e., a larger number of times of top paintings) than other colors, a time required for painting white is longer than that required for painting the other colors. Also, painting of a high-class vehicle requiring a thicker coating also takes a longer time than an ordinary vehicle. In other words, it is general that a passage time through the painting booth differs depending on the specs. In the example shown in FIG. 20, it is assumed that the passage time through the painting booth for a vehicle having a paint color A is 20 minutes, the passage time through the painting booth for a vehicle having a paint color B is 15 minutes, and the passage time through the painting booth for a vehicle having a paint color C is 10 minutes. It is also assumed that a return step for two-tone color painting requires a passage time of 25 minutes, including taping work.

Figure 20B:
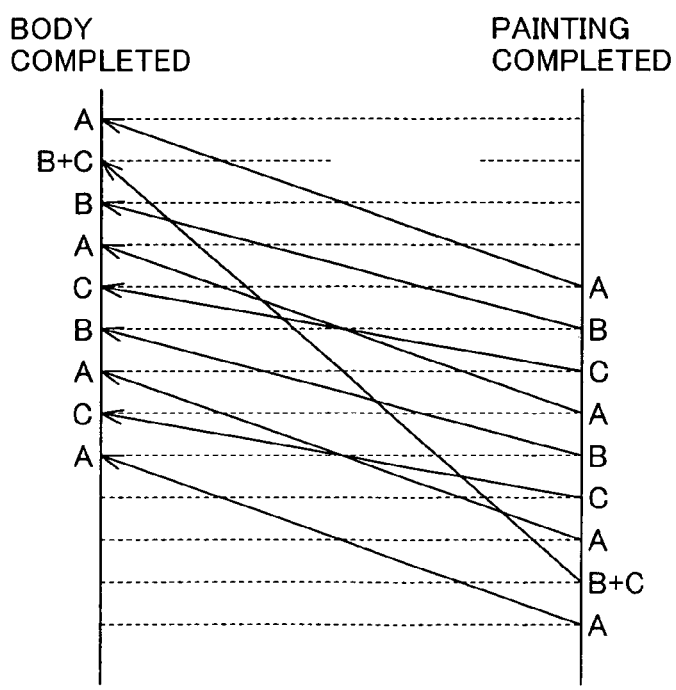

In that case, when the vehicles should be obtained in the sequence of paint colors A, B, C, A, B, C, A, two-tone (B+C), and A at the painting completion point as shown in FIG. 20(B), the sequence can be simply decided by employing the passage time as a lead-time shifting time at the body completion point. In painting the two-tone (B+C) color, for example, a total of 50 minutes, i.e., the passage time of 15 minutes for B+the passage time of 25 minutes for taping+the passage time of 10 minutes for C, is set as the lead time. Each dotted line in FIG. 20(B) represents a time interval of 5 minutes.

Thus, by employing the concepts of the lead-time shifting and the lead-time modification, the building sequence at the desired point can be decided while skipping detailed restrictions inside the plant.

While a time overlap in the body completion process does not occur in the example of FIG. 20, there is some possibility that a time overlap will occur as a result of the lead-time shifting. Even in such a case, a proper building sequence can be obtained by previously deciding a rule in sequencing the vehicles when a time overlap has occurred.

One example of information inputted to the building sequence planning system for the automobile production line according to this embodiment will be described below with reference to FIGS. 21 to 25.

FIGS. 21 to 25 are tables for explaining one example of information inputted to the building sequence planning system for the automobile production line according to one embodiment of the present invention.

FIG. 21 shows one example of assembled vehicle order information inputted to the input unit 1 in FIG. 1. An example of actually operating, based on the order information, the building sequence planning system for the automobile production line according to this embodiment is described with reference to the drawings subsequent to FIG. 22.

It is herein assumed that an order is made for basic vehicles series, i.e., three types of S (sedan), M (mini-van) and R (RV), and eight sedans, eight mini-vans and five RV's are assembled. Also, each vehicle can be set to have any of four specifications, i.e., CD, car navigation, 4WD, and two-tone color. The line section means the manufacturing route. Based on the production line shown in FIG. 4, the building sequence is prepared at each of the sequence decision points shown in FIG. 5. The offline date means a scheduled day on which the relevant vehicle is made offline at the final completion point P6 shown in FIG. 5.

For example, No. 1 is an order for a sedan (S) having a red paint color. The line section "111111" means that the sequence decision points shown in FIG. 5 are given as "setup 1"-"body completion 1"-"painting 1"-"assembly entry 1"-"offline 1"-"final completion 1". Thus, the line section represents the manufacturing route MR1 for the sedan shown in FIG. 4. The offline date is Aug. 30, 2000. "CD" is set as one of the specifications. As another example, No. 15 is an order for a mini-van (M) having two-tone paint colors of red and black. The line section "311121" means that the sequence decision points shown in FIG. 5 are given as "setup 3"-"body completion 1"-"painting 1"-"assembly entry 1"-"offline 2"-"final completion 1". Thus, the line section represents the manufacturing route MR2 for the mini-van shown in FIG. 4. The offline date is Aug. 30, 2000. "CD" and the two-tone painting of red and black are set as the specifications.

FIG. 22 shows one example of the sequence decision point information inputted to the input unit 1 in FIG. 1.

One column item "line section" in FIG. 22 includes three kinds of number strings, i.e., "111111", "311121" and "333333", which represent respectively the three production lines MR1, MR2 and MR3 shown in FIG. 4. Another item "month" represents the production month, e.g., "August", in this example. An item "point name" represents one of the setup point P1, the body completion point P2, the painting completion point P3, the assembly entry point P4, the offline point P5, and the final completion point P6 shown in FIG. 5. Those points are set in one-to-one relation to the respective production lines.

Still another item "24D" represents D (daytime) work on the 24th day, and "24N" represents N (nighttime) work on the 24th day. A numeral per work shift represents the number of vehicles that are scheduled to finish manufacturing in each process during the relevant work shift.

Thus, the sequence decision point information indicates the number of vehicles that are scheduled to finish manufacturing during each work shift at each point per production line.

FIG. 23 shows one example of information regarding the designated number of residing vehicles described above with reference to FIG. 16.

One column item "line section" in FIG. 23 includes three kinds of number strings, i.e., "111111", "311121" and "333333", which represent respectively the three production lines MR1, MR2 and MR3 shown in FIG. 4. Another item "month" represents the production month, e.g., "August", in this example. An item "point name" represents a line between two adjacent processes unlike the "point name" in FIG. 22. More specifically, "body" represents an inter-process line from the setup to the body completion, and "painting" represents an inter-process line from the body completion to the painting completion. Also, "PBS" and "assembly" represent an inter-process line from the painting completion to the assembly entry, and "final" represents an inter-process line from the offline to the final completion. Those points are set in one-to-one relation to the respective production lines.

Still another item "24D" represents D (daytime) work on the 24th day, and "24N" represents N (nighttime) work on the 24th day. A numeral per work shift represents the number of vehicles that are scheduled to finish manufacturing in each process during the relevant work shift.

Thus, the residing-vehicle designated number information indicates the designated number of residing vehicles during each work shift at each point per production line. The designated number of residing vehicles is information that needs to be checked when the lead-time shifting is made between two relevant processes.

FIG. 24 shows one example of basic information for evaluation with respect to the specs (specifications), which is inputted to the input unit 1 in FIG. 1. The basic information for evaluation is inputted in the form of a table indicting evaluation conditions.

Each number in a column item "point" in FIG. 24 corresponds to one of the sequence decision points from the setup point P1 to the final completion point P6 shown in FIG. 5. "CD" and "car navigation" are set, by way of example, as "SPEC (specifications)".

In the example of FIG. 24, only a weight of "5" is set to "CD" and "car navigation" just for P5 of the sequence decision points. This means that Min (minimum interval vehicle number) and Max (maximum succeeding vehicle number) are not designated for all the sequence decision points. Setting of the weight "5" to only the fifth sequence decision point (offline process P5) instructs that the sequence is to be prepared just by applying the leveling condition based on the occupancy rate to the sequence in the offline process.

The designation in the table of FIG. 24 is alterable and the prepared sequence can be controlled by properly setting the conditions on the table of FIG. 24.

FIG. 25 shows a modification condition for a two-tone color. When "SPEC (specifications)" includes the two-tone painting, a column "applied line section" denotes "–11- - -". This means that the modification condition for the two-tone painting is applied between the body completion point P2=1 and the painting completion point P3=1, as shown in FIG. 5.

A column "modification time" indicates the necessity of modifying the schedule by 120 minutes.

Alternatively, the modification can also be made based on "the number of vehicles". An advantage in designating the modification condition based on "the number of vehicles" is that an expected sequence interrupt can be set without depending on the length of a tact (shift work time/number of vehicles manufactured during shift). Stated another way, it is easier to define a joint from a branch line to a main line in the case of a bypassing line in consideration of an advantage from the viewpoint of time.

One example of building sequence information prepared by the building sequence planning system for the automobile production line according to this embodiment will be described below with reference to FIGS. 26 to 32.

FIGS. 26 to 32 are tables for explaining one example of the building sequence information prepared by the building sequence planning system for the automobile production line according to one embodiment of the present invention.

As shown in FIG. 26, the building sequence information comprises vehicle series, paint color, line section, setup point time, body completion point time, painting completion point time, assembly entry point time, offline point time, final completion point time, and specifications (SPEC1, SPEC2).

For example, the vehicle series "S (sedan)" in the first row has the respective items defining the paint color "red", the line section "111111", the setup point time "8/24 17:00", the body completion point time "8/25 16:30", the painting completion point time "8/28 16:30", the assembly entry point time "8/29 17:00", the offline point time "8/30 17:00", the final completion point time "8/31 16:30", and specifications (SPEC1, SPEC2) "CD". Of the information shown in FIG. 26, the vehicle series, the paint color, the line section, the offline point time, and the specifications (SPEC1, SPEC2) are the same as those shown in FIG. 21. In addition, the information in FIG. 26 is set so that the vehicles listed in FIG. 21 reach the offline point at the offline point time designated in FIG. 21 (2001/08/30 for each vehicle). Further, the building sequence and the time at each point are set so as to satisfy those conditions.

There are different vehicle series, i.e., sedan (S), mini-van (M) and RV (R), and these three vehicle series are manufactured along a mixed line as described above with reference to FIG. 3. Even for those vehicles manufactured along the mixed line, an efficient building schedule can be easily prepared by employing this embodiment.

FIG. 27 is a table obtained by taking out the building sequence in the offline process shown in FIG. 26, distributing the vehicles to the offline lines 1, 2 and 3, and rearranging the building sequence for each offline line. Because different lines are employed, this table includes the settings at the same time of day.

Thus, since the building sequence can be outputted at each building point, it is possible to easily know the building sequence per point in each process.

Next, FIG. 28 shows the lead-time shifting from the offline process to the assembly entry process. Because there are neither branches nor joints in the lines between those two processes, the building sequence in the assembly entry process is decided in conformity with the offline sequence.

On the other hand, FIG. 29 shows the lead-time shifting from the assembly entry process to the painting completion process. It is understood that the assembly entry lines 1, 2 are concentrated in the painting completion line 1.

Also, FIG. 30 shows the lead-time shifting from the painting completion process to the body completion process. Because a vehicle M15 having the "two-tone" specification takes a longer time for the two-tone color painting, it is loaded in the body completion process with a lead-time shift corresponding to the time required for the two-tone color painting.

Further, FIG. 31 shows the lead-time shifting from the body completion process to the setup. As will be seen, vehicles in "body completion 1" are separated into "setups 1 and 3".

Moreover, FIG. 32 shows the lead-time shifting from the offline to the final completion process.

An automobile is a product having an extremely high production cost, and therefore overstocked inventories accompany a serious risk. Also, with regard to the problems such as in what kinds of specifications and options the inventories should be prepared, an automobile maker is required to minimize the inventories or to have no inventories. Further, for the purpose of maintaining competitiveness, it is required to shorten a period from an order to delivery (called a lead time on the maker side) and to improve customer's satisfaction. Additionally, an increase of operation efficiency in a factory results in a larger number of vehicles manufactured per day and a lower production cost.

Under those conditions, it is essential for the factory to, in response to an order, quickly make arrangements for production by efficiently adding the order to the building sequence of vehicles for which instructions are already issued to the lines to complete the assembly in accordance with a schedule, so that the building sequence for all the processes is rearranged.

To that end, in this embodiment, after deciding a building sequence, the building sequence for each of the preceding and succeeding processes is decided while performing the lead-time shifting and the lead-time modification. The thus-decided building sequence is checked in accordance with the preset evaluation conditions for the specifications and the options. Whenever an offensive portion is detected, a penalty value is calculated based on the preset weight and evaluation formula, and a building sequence providing a minimum penalty value is obtained through repeated searches. As a result, a building sequence schedule ensuring high operability can be prepared in a short time. It is therefore possible to not only reduce a burden imposed on the person in charge of planning, but also to cut a time required for planning the building sequence and to extend the time limit for an order, thus resulting in an improvement of customer's serviceability and order accuracy. Also, since such an improvement in working efficiency ensures rigid adherence to the production frame (i.e., the number of vehicles manufactured), etc., opportunities of profit loss are reduced. Further, preparation of predicted order information makes it possible to prepare predicted production sequence information for a considerable number of days in the future with inputting of the predicted order, and to present the predicted production sequence information to parts makers, etc. in advance. This creates an environment in which the parts makers are able to properly carry out production schedules and inventory schedules. When the number of days in the future is longer than a lead time required for the parts makers to manufacture parts, inventories of the parts makers can be made zero.

With this embodiment, as described above, a building sequence satisfying requirements of a plurality of processes in a well-balanced manner can be easily prepared in a mixed line including branches and joints, whereby "quick" and "efficient" planning can be realized. Further, added values are obtained in not only cutting the time required for planning the building sequence and extending the time limit for an order, but also in increasing the working efficiency and ensuring rigid adherence to the production frame (i.e., the number of vehicles manufactured).

INDUSTRIAL APPLICABILITY

According to the present invention, a building sequence planning system for an automobile production line can be provided which is able to prepare an efficient building sequence.

The invention claimed is:

1. A building sequence planning system for an automobile production line, said system comprising:
   an input unit for inputting vehicle information of vehicles to be manufactured, the vehicle information including the number of vehicles residing or accumulated between two processes,
   a processing unit for deciding an optimum building sequence based on the vehicle information inputted through said input unit, and
   an output unit for externally outputting a building sequence schedule decided by said processing unit,
   wherein said automobile production line is a mixed line including a first line and a second line respectively in parallel, and a third line branching from said second line and joining with said first line,
   wherein said processing unit includes an initial offline sequence preparing unit for preparing an initial vehicle building sequence of the automobile production line based on the vehicle information input to said input unit, and operates to output said optimum building sequence by (i) calculating an evaluation value from the vehicle information, including an initial automobile building sequence, input to said input unit, and storing the evaluation value, (ii) calculating a new evaluation value from another, new automobile building sequence, (iii) comparing the new evaluation value with the stored evaluation value, (iv) adopting the new automobile building sequence when the new evaluation value is improved, (v) discarding the new automobile building sequence when the new evaluation value is not improved, (vi) ending processing when repetitive searches have been completed, and (vii) outputting a most recently adopted automobile building sequence as said optimum building sequence.

2. A building sequence planning system for an automobile production line according to claim 1, wherein the vehicle information includes information relating to when a vehicle has to pass a line twice because of work for two-tone color painting.

3. A building sequence planning system for an automobile production line according to claim 1, wherein the processing unit shifts an assembly entry time of a vehicle to be assembled by a time corresponding to said number of vehicles residing or accumulated between said two processes.

* * * * *

UNITED STATES PATENT AND TRADEMARK OFFICE
CERTIFICATE OF CORRECTION

| | |
|---|---|
| PATENT NO. | : 7,577,485 B2 |
| APPLICATION NO. | : 10/507520 |
| DATED | : August 18, 2009 |
| INVENTOR(S) | : Onizawa et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 732 days.

Signed and Sealed this

Seventh Day of September, 2010

David J. Kappos
*Director of the United States Patent and Trademark Office*